(12) United States Patent
Greenberg et al.

(10) Patent No.: US 8,498,538 B2
(45) Date of Patent: Jul. 30, 2013

(54) COMPACT MONOLITHIC DISPERSION COMPENSATOR

(75) Inventors: Michael Greenberg, Santa Rosa, CA (US); Kok Wai Chang, Los Altos, CA (US)

(73) Assignee: Raydiance, Inc., Petaluma, CA (US)

( * ) Notice: Subject to any disclaimer, the term of this patent is extended or adjusted under 35 U.S.C. 154(b) by 711 days.

(21) Appl. No.: 12/618,610

(22) Filed: Nov. 13, 2009

(65) Prior Publication Data

US 2010/0149641 A1 Jun. 17, 2010

Related U.S. Application Data

(60) Provisional application No. 61/114,972, filed on Nov. 14, 2008.

(51) Int. Cl.
*H04J 14/02* (2006.01)
*G02B 5/18* (2006.01)

(52) U.S. Cl.
USPC .......................................... 398/87; 359/572

(58) Field of Classification Search
USPC ................. 359/566, 569, 572, 834; 398/84, 398/87
See application file for complete search history.

(56) References Cited

U.S. PATENT DOCUMENTS

| | | |
|---|---|---|
| 2,436,662 A | 2/1948 | Norgaard |
| 3,459,960 A | 8/1969 | Aaland et al. |
| 3,599,019 A | 8/1971 | Nannichi et al. |
| 3,602,836 A | 8/1971 | Young |
| 3,626,318 A | 12/1971 | Young |
| 3,646,469 A | 2/1972 | Buczek et al. |
| 3,654,624 A | 4/1972 | Becker et al. |
| 3,764,641 A | 10/1973 | Ash |
| 3,806,829 A | 4/1974 | Duston et al. |
| 3,851,267 A | 11/1974 | Tanner |
| 3,963,953 A | 6/1976 | Thornton, Jr. |
| 4,061,427 A | 12/1977 | Fletcher et al. |
| 4,194,813 A | 3/1980 | Benjamin et al. |
| 4,289,378 A | 9/1981 | Remy et al. |
| 4,449,215 A | 5/1984 | Reno |

(Continued)

FOREIGN PATENT DOCUMENTS

| | | |
|---|---|---|
| EP | 0214100 | 3/1987 |
| EP | 0691563 | 1/1996 |

(Continued)

OTHER PUBLICATIONS

Siegman, "Unstable Optical Resonators", Applied Optics, Feb. 1974, pp. 353-367, vol. 13, No. 2.

(Continued)

*Primary Examiner* — Alessandro Amari
(74) *Attorney, Agent, or Firm* — Haverstock & Owens, LLP

(57) ABSTRACT

An optical signal control system is constructed from a portion of a material and allows for controlled amount of negative dispersion to be generated across a broadband input signal. The block may be made of a single portion of the material and have surfaces with reflective, transmissive, and/or diffractive optical characteristics. By adjusting the physical dimensions of the block substrate and the line pitch of a diffraction grating etched into a surface of the block, the magnitude of the dispersion can be varied. Laser systems that utilize the optical signal control system may have reduced size and weight as compared to existing compressors and be more robust against misalignment.

4 Claims, 17 Drawing Sheets

U.S. PATENT DOCUMENTS

| | | | |
|---|---|---|---|
| 4,590,598 A | 5/1986 | O'Harra, II |
| 4,718,418 A | 1/1988 | L'Esperance, Jr. |
| 4,730,113 A | 3/1988 | Edwards et al. |
| 4,808,000 A | 2/1989 | Pasciak |
| 4,827,125 A | 5/1989 | Goldstein |
| 4,835,670 A | 5/1989 | Adams et al. |
| 4,847,846 A | 7/1989 | Sone et al. |
| 4,848,340 A | 7/1989 | Bille et al. |
| 4,856,011 A | 8/1989 | Shimada et al. |
| 4,902,127 A | 2/1990 | Byer et al. |
| 4,907,586 A | 3/1990 | Bille et al. |
| 4,915,757 A | 4/1990 | Rando |
| 4,947,398 A | 8/1990 | Yasuda et al. |
| 4,950,268 A | 8/1990 | Rink |
| 4,983,034 A | 1/1991 | Spillman, Jr. |
| 4,994,059 A | 2/1991 | Kosa et al. |
| 5,010,555 A | 4/1991 | Madey et al. |
| 5,014,290 A | 5/1991 | Moore et al. |
| 5,022,042 A | 6/1991 | Bradley |
| 5,031,236 A | 7/1991 | Hodgkinson et al. |
| 5,043,991 A | 8/1991 | Bradley |
| 5,098,426 A | 3/1992 | Sklar et al. |
| 5,154,707 A | 10/1992 | Rink et al. |
| 5,159,402 A | 10/1992 | Ortiz, Jr. |
| 5,162,643 A | 11/1992 | Currie |
| 5,204,867 A | 4/1993 | Koschmann |
| 5,206,455 A | 4/1993 | Williams et al. |
| 5,255,117 A | 10/1993 | Cushman |
| 5,265,107 A | 11/1993 | Delfyett, Jr. |
| 5,301,347 A | 4/1994 | Kensky |
| 5,302,835 A | 4/1994 | Bendett et al. |
| 5,309,453 A | 5/1994 | Treacy |
| 5,315,436 A | 5/1994 | Lowenhar et al. |
| 5,355,383 A | 10/1994 | Lockard |
| 5,418,809 A | 5/1995 | August, Jr. et al. |
| 5,428,471 A | 6/1995 | McDermott |
| 5,440,573 A | 8/1995 | Fermann |
| 5,479,422 A | 12/1995 | Fermann et al. |
| 5,493,579 A | 2/1996 | Ressl et al. |
| 5,517,043 A | 5/1996 | Ma et al. |
| 5,548,098 A | 8/1996 | Sugawara et al. |
| 5,572,335 A | 11/1996 | Stevens |
| 5,572,358 A | 11/1996 | Gabl et al. |
| 5,585,642 A | 12/1996 | Britton et al. |
| 5,585,652 A | 12/1996 | Kamasz et al. |
| 5,585,913 A | 12/1996 | Hariharan et al. |
| 5,590,142 A | 12/1996 | Shan |
| 5,592,327 A | 1/1997 | Gabl et al. |
| 5,624,587 A | 4/1997 | Otsuki et al. |
| 5,625,544 A | 4/1997 | Kowshik et al. |
| 5,633,750 A | 5/1997 | Nogiwa et al. |
| 5,633,885 A | 5/1997 | Galvanauskas et al. |
| 5,651,018 A | 7/1997 | Mehuys et al. |
| 5,656,186 A | 8/1997 | Mourou et al. |
| 5,663,731 A | 9/1997 | Theodoras, II et al. |
| 5,665,942 A | 9/1997 | Williams et al. |
| 5,670,067 A | 9/1997 | Koide et al. |
| 5,677,769 A | 10/1997 | Bendett |
| 5,689,519 A | 11/1997 | Fermann et al. |
| 5,696,782 A | 12/1997 | Harter et al. |
| 5,703,639 A | 12/1997 | Farrier et al. |
| 5,710,424 A | 1/1998 | Theodoras, II et al. |
| 5,720,894 A | 2/1998 | Neev et al. |
| 5,739,933 A | 4/1998 | Dembeck et al. |
| 5,770,864 A | 6/1998 | Dlugos |
| 5,771,253 A | 6/1998 | Chang-Hasnain et al. |
| 5,778,016 A | 7/1998 | Sucha et al. |
| 5,786,117 A | 7/1998 | Hoshi et al. |
| 5,788,688 A | 8/1998 | Bauer et al. |
| 5,790,574 A | 8/1998 | Rieger et al. |
| 5,815,519 A | 9/1998 | Aoshima et al. |
| 5,862,845 A | 1/1999 | Chin et al. |
| 5,875,408 A | 2/1999 | Bendett et al. |
| 5,880,823 A | 3/1999 | Lu |
| 5,898,485 A | 4/1999 | Nati, Jr. |
| 5,907,157 A | 5/1999 | Yoshioka et al. |
| 5,929,430 A | 7/1999 | Yao et al. |
| 5,936,716 A | 8/1999 | Pinsukanjana et al. |
| 6,034,975 A | 3/2000 | Harter et al. |
| 6,041,020 A | 3/2000 | Caron et al. |
| 6,061,373 A | 5/2000 | Brockman et al. |
| 6,075,588 A | 6/2000 | Pinsukanjana et al. |
| 6,099,522 A | 8/2000 | Knopp et al. |
| 6,134,003 A | 10/2000 | Tearney et al. |
| 6,168,590 B1 | 1/2001 | Neev |
| 6,172,611 B1 | 1/2001 | Hussain et al. |
| 6,179,421 B1 | 1/2001 | Pang |
| 6,181,463 B1 | 1/2001 | Galvanauskas et al. |
| 6,198,568 B1 | 3/2001 | Galvanauskas et al. |
| 6,208,458 B1 | 3/2001 | Galvanauskas et al. |
| 6,228,748 B1 | 5/2001 | Anderson et al. |
| 6,246,816 B1 | 6/2001 | Moore et al. |
| 6,249,630 B1 | 6/2001 | Stock et al. |
| 6,256,328 B1 | 7/2001 | Delfyett et al. |
| 6,271,650 B1 | 8/2001 | Massie et al. |
| 6,275,250 B1 | 8/2001 | Sanders et al. |
| 6,290,910 B1 | 9/2001 | Chalk |
| 6,303,903 B1 | 10/2001 | Liu |
| 6,314,115 B1 | 11/2001 | Delfyett et al. |
| 6,335,821 B1 | 1/2002 | Suzuki et al. |
| 6,340,806 B1 | 1/2002 | Smart et al. |
| RE37,585 E | 3/2002 | Mourou et al. |
| 6,355,908 B1 | 3/2002 | Tatah et al. |
| 6,359,681 B1 | 3/2002 | Housand et al. |
| 6,366,395 B1 | 4/2002 | Drake et al. |
| 6,370,171 B1 | 4/2002 | Horn et al. |
| 6,371,469 B1 | 4/2002 | Gray |
| 6,396,317 B1 | 5/2002 | Roller et al. |
| 6,407,363 B2 | 6/2002 | Dunsky et al. |
| 6,418,154 B1 | 7/2002 | Kneip et al. |
| 6,425,912 B1 | 7/2002 | Knowlton |
| 6,433,760 B1 | 8/2002 | Vaissie et al. |
| 6,463,314 B1 | 10/2002 | Haruna |
| 6,485,413 B1 | 11/2002 | Boppart et al. |
| 6,486,435 B1 | 11/2002 | Beyer et al. |
| 6,496,099 B2 | 12/2002 | Wang et al. |
| 6,501,590 B2 | 12/2002 | Bass et al. |
| 6,522,460 B2 | 2/2003 | Bonnedal et al. |
| 6,522,674 B1 | 2/2003 | Niwano et al. |
| 6,525,873 B2 | 2/2003 | Gerrish et al. |
| 6,526,085 B2 | 2/2003 | Vogler et al. |
| 6,529,319 B2 | 3/2003 | Youn et al. |
| 6,547,453 B1 | 4/2003 | Stummer et al. |
| 6,549,547 B2 | 4/2003 | Galvanauskas et al. |
| 6,562,698 B2 | 5/2003 | Manor |
| 6,570,704 B2 | 5/2003 | Palese |
| 6,574,024 B1 | 6/2003 | Liu |
| 6,576,917 B1 | 6/2003 | Silfvast |
| 6,580,553 B2 | 6/2003 | Kim et al. |
| 6,592,574 B1 | 7/2003 | Shimmick et al. |
| 6,614,565 B1 | 9/2003 | Klug et al. |
| 6,621,045 B1 | 9/2003 | Liu et al. |
| 6,654,161 B2 | 11/2003 | Bass et al. |
| 6,661,568 B2 | 12/2003 | Hollemann et al. |
| 6,661,820 B1 | 12/2003 | Camilleri et al. |
| 6,681,079 B1 | 1/2004 | Maroney |
| 6,690,686 B2 | 2/2004 | Delfyett et al. |
| 6,697,402 B2 | 2/2004 | Crawford |
| 6,697,408 B2 | 2/2004 | Kennedy et al. |
| 6,700,094 B1 | 3/2004 | Kuntze |
| 6,706,036 B2 | 3/2004 | Lai |
| 6,706,998 B2 | 3/2004 | Cutler |
| 6,724,508 B2 * | 4/2004 | Pierce et al. ............... 359/15 |
| 6,728,273 B2 | 4/2004 | Perry |
| 6,728,439 B2 | 4/2004 | Weisberg et al. |
| 6,735,229 B1 | 5/2004 | Delfyett et al. |
| 6,738,144 B1 | 5/2004 | Dogariu |
| 6,738,408 B2 | 5/2004 | Abedin |
| 6,744,552 B2 | 6/2004 | Scalora et al. |
| 6,744,555 B2 | 6/2004 | Galvanauskas et al. |
| 6,765,724 B1 * | 7/2004 | Kramer ..................... 359/566 |
| 6,774,869 B2 | 8/2004 | Biocca et al. |
| 6,782,207 B1 | 8/2004 | Efimov |
| 6,787,733 B2 | 9/2004 | Lubatschowski et al. |
| 6,787,734 B2 | 9/2004 | Liu |
| 6,801,551 B1 | 10/2004 | Delfyett et al. |
| 6,807,375 B2 | 10/2004 | Dogariu |

| | | | | | | |
|---|---|---|---|---|---|---|
| 6,815,638 B2 | 11/2004 | Liu | | 2005/0171518 A1 | 8/2005 | Stoltz et al. |
| 6,819,694 B2 | 11/2004 | Jiang et al. | | 2005/0177143 A1 | 8/2005 | Bullington et al. |
| 6,819,837 B2 | 11/2004 | Li et al. | | 2005/0213630 A1 | 9/2005 | Mielke et al. |
| 6,822,187 B1 | 11/2004 | Hermann et al. | | 2005/0215985 A1 | 9/2005 | Mielke et al. |
| 6,829,517 B2 | 12/2004 | Cheng et al. | | 2005/0218122 A1 | 10/2005 | Yamamoto et al. |
| 6,834,134 B2 | 12/2004 | Brennan, III et al. | | 2005/0225846 A1 | 10/2005 | Nati et al. |
| 6,836,703 B2 | 12/2004 | Wang et al. | | 2005/0226286 A1 | 10/2005 | Liu et al. |
| 6,878,900 B2 | 4/2005 | Corkum et al. | | 2005/0226287 A1 | 10/2005 | Shah et al. |
| 6,887,804 B2 | 5/2005 | Sun et al. | | 2005/0253482 A1 | 11/2005 | Kapps et al. |
| 6,897,405 B2 | 5/2005 | Cheng et al. | | 2005/0265407 A1 | 12/2005 | Braun et al. |
| 6,915,040 B2 | 7/2005 | Willner et al. | | 2005/0271094 A1 | 12/2005 | Miller et al. |
| 6,917,631 B2 | 7/2005 | Richardson et al. | | 2005/0274702 A1 | 12/2005 | Deshi |
| 6,928,490 B1 | 8/2005 | Bucholz et al. | | 2006/0016891 A1 | 1/2006 | Giebel et al. |
| 6,994,703 B2 | 2/2006 | Wang et al. | | 2006/0030951 A1 | 2/2006 | Davlin et al. |
| 7,001,373 B2 | 2/2006 | Clapham et al. | | 2006/0056480 A1 | 3/2006 | Mielke et al. |
| 7,002,733 B2 | 2/2006 | Dagenais et al. | | 2006/0067604 A1 | 3/2006 | Bull et al. |
| 7,068,408 B2 | 6/2006 | Sakai | | 2006/0084957 A1 | 4/2006 | Delfyett et al. |
| 7,097,640 B2 | 8/2006 | Wang et al. | | 2006/0093265 A1 | 5/2006 | Jia et al. |
| 7,116,688 B2 | 10/2006 | Sauter et al. | | 2006/0131288 A1 | 6/2006 | Sun et al. |
| 7,143,769 B2 | 12/2006 | Stoltz et al. | | 2006/0159137 A1 | 7/2006 | Shah |
| 7,217,266 B2 | 5/2007 | Anderson et al. | | 2006/0187974 A1 | 8/2006 | Dantus |
| 7,220,255 B2 | 5/2007 | Lai | | 2006/0249816 A1 | 11/2006 | Li et al. |
| 7,332,234 B2 | 2/2008 | Levinson et al. | | 2006/0250025 A1 | 11/2006 | Kitagawa et al. |
| 7,349,589 B2 | 3/2008 | Temelkuran et al. | | 2006/0268949 A1 | 11/2006 | Gohle et al. |
| 7,367,969 B2 | 5/2008 | Stoltz et al. | | 2007/0047965 A1 | 3/2007 | Liu et al. |
| 7,413,565 B2 | 8/2008 | Wang et al. | | 2007/0098025 A1 | 5/2007 | Hong et al. |
| 7,414,780 B2 | 8/2008 | Fermann et al. | | 2007/0106416 A1 | 5/2007 | Griffiths et al. |
| 7,505,196 B2 | 3/2009 | Nati et al. | | 2007/0229939 A1 | 10/2007 | Brown et al. |
| 7,674,719 B2 | 3/2010 | Li et al. | | 2007/0253455 A1 | 11/2007 | Stadler et al. |
| 7,675,674 B2 | 3/2010 | Bullington et al. | | 2008/0050078 A1 | 2/2008 | Digonnet et al. |
| 7,728,967 B2 | 6/2010 | Ochiai et al. | | 2008/0058781 A1 | 3/2008 | Langeweyde et al. |
| 7,751,118 B1 | 7/2010 | Di Teodoro et al. | | 2008/0240184 A1 | 10/2008 | Cho et al. |
| 7,759,607 B2 | 7/2010 | Chism, II | | 2009/0020511 A1 | 1/2009 | Kommera et al. |
| 7,773,216 B2 | 8/2010 | Cheng et al. | | 2009/0244695 A1 | 10/2009 | Marcinkevicius et al. |
| 7,792,408 B2 | 9/2010 | Varming | | 2009/0245302 A1 | 10/2009 | Baird et al. |
| 7,822,347 B1 | 10/2010 | Brennan, III et al. | | 2009/0257464 A1 | 10/2009 | Dantus et al. |
| 7,963,958 B2 | 6/2011 | Stoltz et al. | | 2009/0273828 A1 | 11/2009 | Waarts et al. |
| 2001/0021294 A1 | 9/2001 | Cai et al. | | 2009/0290151 A1 | 11/2009 | Agrawal et al. |
| 2001/0046243 A1 | 11/2001 | Schie | | 2009/0297155 A1 | 12/2009 | Weiner et al. |
| 2002/0071454 A1 | 6/2002 | Lin | | 2010/0013036 A1 | 1/2010 | Carey |
| 2002/0091325 A1 | 7/2002 | Ostrovsky | | 2010/0040095 A1 | 2/2010 | Mielke et al. |
| 2002/0097468 A1 | 7/2002 | Mecherle et al. | | 2010/0118899 A1 | 5/2010 | Peng et al. |
| 2002/0097761 A1 | 7/2002 | Sucha et al. | | 2010/0181284 A1 | 7/2010 | Lee et al. |
| 2002/0115273 A1 | 8/2002 | Chandra et al. | | | | |
| 2002/0118934 A1 | 8/2002 | Danziger et al. | | | | |
| 2002/0153500 A1 | 10/2002 | Fordahl et al. | | | | |
| 2002/0167581 A1 | 11/2002 | Cordingley et al. | | | | |
| 2002/0167974 A1 | 11/2002 | Kennedy et al. | | | | |
| 2002/0191901 A1 | 12/2002 | Jensen | | | | |
| 2003/0011782 A1 | 1/2003 | Tanno | | | | |
| 2003/0031410 A1 | 2/2003 | Schnitzer | | | | |
| 2003/0055413 A1 | 3/2003 | Altshuler et al. | | | | |
| 2003/0060808 A1 | 3/2003 | Wilk | | | | |
| 2003/0086647 A1 | 5/2003 | Willner et al. | | | | |
| 2003/0123496 A1 | 7/2003 | Broutin et al. | | | | |
| 2003/0142705 A1 | 7/2003 | Hackel et al. | | | | |
| 2003/0156605 A1 | 8/2003 | Richardson et al. | | | | |
| 2003/0178396 A1 | 9/2003 | Naumov et al. | | | | |
| 2003/0205561 A1 | 11/2003 | Iso | | | | |
| 2003/0223689 A1 | 12/2003 | Koch et al. | | | | |
| 2003/0235381 A1 | 12/2003 | Hunt | | | | |
| 2004/0022695 A1 | 2/2004 | Simon et al. | | | | |
| 2004/0042061 A1 | 3/2004 | Islam et al. | | | | |
| 2004/0049552 A1 | 3/2004 | Motoyama et al. | | | | |
| 2004/0101001 A1 | 5/2004 | Bergmann et al. | | | | |
| 2004/0128081 A1 | 7/2004 | Rabitz et al. | | | | |
| 2004/0134894 A1 | 7/2004 | Gu et al. | | | | |
| 2004/0160995 A1 | 8/2004 | Sauter et al. | | | | |
| 2004/0226922 A1 | 11/2004 | Flanagan | | | | |
| 2004/0226925 A1 | 11/2004 | Gu et al. | | | | |
| 2004/0263950 A1 | 12/2004 | Fermann et al. | | | | |
| 2005/0035097 A1 | 2/2005 | Stoltz | | | | |
| 2005/0036527 A1 | 2/2005 | Khazaei et al. | | | | |
| 2005/0038487 A1 | 2/2005 | Stoltz | | | | |
| 2005/0065502 A1 | 3/2005 | Stoltz | | | | |
| 2005/0077275 A1 | 4/2005 | Stoltz | | | | |
| 2005/0111073 A1 | 5/2005 | Pan et al. | | | | |
| 2005/0154380 A1 | 7/2005 | DeBenedictis et al. | | | | |
| 2005/0163426 A1 | 7/2005 | Fermann et al. | | | | |

FOREIGN PATENT DOCUMENTS

| | | |
|---|---|---|
| EP | 1462831 | 9/2004 |
| JP | 8171103 | 7/1996 |
| JP | 11189472 | 7/1999 |
| JP | 2003181661 | 7/2003 |
| JP | 2003344883 | 12/2003 |
| JP | 2005174993 | 6/2005 |
| WO | WO9428972 | 12/1994 |
| WO | WO2004105100 | 12/2004 |
| WO | WO2004114473 | 12/2004 |
| WO | WO2005018060 | 2/2005 |
| WO | WO2005018061 | 2/2005 |
| WO | WO2005018062 | 2/2005 |
| WO | WO2005018063 | 2/2005 |
| WO | WO2007034317 | 3/2007 |

OTHER PUBLICATIONS

Stevenson et al., Femtosecond Optical Transfection of Cells: Viability and Efficiency, Optics Express, vol. 14, No. 16, pp. 7125-7133, Aug. 7, 2006.

Stock et al., "Chirped Pulse Amplification in an Erbium-doped fiber Oscillator/Erbium-doped Fiber Amplifier System", Optics Communications, North-Holland Publishing Co., Amsterdam, NL, vol. 106, No. 4/5/06, Mar. 15, 1994, pp. 249-252, XP000429901, ISSN: 0030-4018.

Strickland et al., "Compression of Amplified Chirped Optical Pulses", Optics Communications, North-Holland Publishing Co., Amersterdam, NL, vol. 56, No. 3, Dec. 1, 1985, pp. 219-221, XP024444933 ISSN: 0030-4018.

Temelkuran, B. et al., "Wavelength-scalable Hollow Optical Fibres with Large Photonic Bandgaps for CO2 Laser Transmission," Nature, Dec. 12, 2002, pp. 650-653.

Thurston, R.N. et al., "Analysis of Picosecond Pulse Shape Synthesis by Spectral Masking in a Grating Pulse Compressor," IEEE Journal of Quantum Electronics, vol. EQ-22, No. 5, pp. 682-696, May 1986.

Tirlapur et al., "Targeted Transfection by Femtosecond Laser," Nature Publishing Group, vol. 418, pp. 290-291, Jul. 18, 2002.

Tsai et al., "Ultrashort Pulsed Laser Light," Optics & Photonics News, pp. 25-29, Jul. 2004.

Vaissie et al., "Desktop Ultra-Short Pulse Laser at 1552 nm,"Ultrashort Pulse Laser Materials Interaction Workshop (Raydiance)—Directed Energy Professional Society (DEPS), Sep. 28, 2006.

Weiner, A.M. et al., "Synthesis of Phase-coherent, Picosecond Optical Square Pulses," Optics Letters, vol. 11, No. 3, pp. 153-155, Mar. 1986.

Weiner, A.M., "Femtosecond Optical Pulse Shaping and Processing," Prog. Quant. Electr. 1995, vol. 19, pp. 161-237, 1995.

Weiner, A.M., "High-resolution femtosecond Pulse Shaping," Journal of the Optical Society of America B. vol. 5, No. 8, pp. 1563-1572, Aug. 1988.

Wells, D.J., "Gene Therapy Progress and Prospects: electroporation and Other Physical Methods," Gene Therapy, Nature Publishing Group, vol. 11, pp. 1363-1369, Aug. 5, 2004, (http://www.nature.com/gt).

White, W.E., et al., "Compensation of Higher-order Frequency-dependent Phase Terms in Chirped-pulse Amplification Systems," Optics Letters, vol. 18, No. 16, pp. 1343-1345, Aug. 15, 1993.

Yamakawa et al., "1 Hz, 1 ps, terawatt Nd: glass laser", Optics Communications, North-Holland Publishing Co. Amsterdam, NL, vol. 112, No. 1-2, Nov. 1, 1994, pp. 37-42, XP024424285.

Yan et al., Ultrashort Pulse Measurement Using Interferometric Autocorrelator Based on Two-photon-absorbtion Detector at 1.55 μm Wavelength Region., 2005, Proceedings of SPIE vol. 5633, Advanced Materials and Devices for Sensing and Imaging II, pp. 424-429.

Yeh, et al. "Theory of Bragg Fiber", Journal of the Optical Society America, Sep. 1978, pp. 1196, vol. 68, No. 9., pp. 1196-1201.

Yi, Y. et al., "Sharp Bending of On-Chip silicon Bragg Cladding Waveguide With Light Guiding on Low Index Core Materials", IEEE Journal of Selected Topics in Quantum Electronics, vol. 12, No. 6, Nov./Dec. 2006, pp. 1345-1348.

Yi, Y., et al., "On-chip Si-based Bragg Cladding Waveguide with High Index Contrast Bilayers", Optics Express, vol. 12, No. 20, Oct. 4, 2004, pp. 4775-4780.

Yin, D. et al., "Integrated ARROW Waveguides with Hollow Cores", Optics Express, vol. 12, No. 12, Jun. 14, 2004, pp. 2710-2715.

Zhou, S. et al., "Compensation of nonlinear Phase Shifts with Third-order Dispersion in Short-pulse Fiber Amplifiers," Optics Express, vol. 13, No. 13, pp. 4869-2877, Jun. 27, 2005.

Agostinelli, J. et al., "Optical Pulse Shaping with a Grating Pair," Applied Optics, vol. 18, No. 14, pp. 2500-2504, Jul. 15, 1979.

Anastassiou et al., "Photonic Bandgap Fibers Exploiting Omnidirectional Reflectivity Enable Flexible Delivery of Infrared Lasers for Tissue Cutting," Proceedings of the SPIE—the International Society for Optical Engineering, SPIE, US, vol. 5317, No. 1, Jan. 1, 2004, pp. 29-38, XP002425586 ISSN: 0277-786X.

Benoit, G. et al., "Dynamic All-optical Tuning of Transverse Resonant Cavity Modes in Photonic Bandgap Fibers,"Optics Letters, vol. 30, No. 13, Jul. 1, 2005, pp. 1620-1622.

Chen, L. et al., "Ultrashort Optical Pulse Interaction with Fibre Gratings and Device Applications," 1997, Canaga, located at http://www.collectionscanada.ca/obj/s4/f2/dsk2iftp04/mq29402.pfd.

Chen, X. et al., "Highly Birefringent Hollow-core Photonic Bandgap Fiber," Optics Express, vol. 12, No. 16, Aug. 9, 2004, pp. 3888-3893.

Chen, Y. et al., "Dispersion-Managed Mode Locking", Journal of the Optical Society of America B, Nov. 1999, pp. 1999-2004, vol. 16, No. 11, Optical Society of America.

Dasgupta, S. et al., "Design of Dispersion-Compensating Bragg Fiber with an Ultrahigh Figure of Merit," Optics Letters, Aug. 1, 2005, vol. 30, No. 15, Optical Society of America.

De Matos et al., "Multi-kilowatt, Picosecond Pulses from an All-fiber Chirped Pulse Amplification System Using Air-core Photonic Bandgalp Fiber", Lasers and Electro-optics, 2004, (CLEO), Conference on San Francisco, CA USA, May 20-21, 2004, Piscataway, NJ, USA, IEEE, Vol. May 17, 2004, pp. 973-974, XP010745448 ISBN: 978-1-55752-777-6.

De Matos, C.J.S. et al., "All-fiber Chirped Pulse Amplification using Highly-dispersive Air-core Photonic Bandgap Fiber," Nov. 3, 2003, Optics Express, pp. 2832-2837, vol. 11, No. 22.

Delfyett, P. et al., "Ultrafast Semiconductor Laser-Diode-Seeded Cr:LiSAF Rengerative Amplifier System", Applied Optics, May 20, 1997, pp. 3375-3380, vol. 36, No. 15, Octoical Society of America.

Eggleton, et al., "Electrically Tunable Power Efficient Dispersion Compensating Fiber Bragg Grating," IEEE Photonics Technology Letters, vol. 11, No. 7, pp. 854-856, Jul. 1999.

Engeness et al., "Dispersion Tailoring and Compensation by Modal Interations in Omniguide Fibers," Optics Express, May 19, 2003, pp. 1175-1196, vol. 11, No. 10.

Fink et al., "Guiding Optical Light in Air Using an All-Dielectric Structure," Journal of Lightwave Technology, Nov. 1999, pp. 2039-2041, vol. 17, No. 11.

Folkenberg, J.R., et al., "Broadband Single-polarization Photonic Crystal Fiber," Optics Letters, vol. 30, No. 12, Jun. 15, 2005, pp. 1446-1448.

Folkenberg, J.R., et al., "Polarization Maintaining Large Mode Area Photonic Crystal Fiber," Optics Express vol. 12, No. 5, Mar. 8, 2004, pp. 956-960.

Futami, F., et al., "Wideband Fibre Dispersion Equalisation up to Fourth-order for Long-distance Sub-picosecond Optical Pulse Transmission," Electronics Letters, vol. 35, No. 25, Dec. 9, 1999.

Galvanauskas, A. et al., "Chirped-pulse-amplification Circuits for Fiber Amplifiers, Based on Chirped-period Quasi-phase, matching gratings", Optics Letters, Nov. 1, 1998, p. 1695-1697, vol. 23, No. 21, Optical Society of America.

Hartl et al., "In-line high energy Yb Fiber Laser Based Chirped Pulse Amplifier System", Laser and Electro-Optics, 2004, (CLEO) Conference of San Francisco, CA USA May 20-21, 2004, Piscataway, NJ, USA, IEEE, vol. 1, May 17, 2004, pp. 563-565, XP010745382, ISBN: 978-1-55752-7777.

Hellstrom, E. et al., "Third-order Dispersion Compensation Using a Phase Modulator", Journal of Lightwave Technology, vol. 21, No. 5, pp. 1188-1197, May 2003.

Heritage, J. P. et al., "Picosecond Pulse Shaping by Spectral Phase and Amplitude Manipulation," Optics Letters, vol. 10, No. 12, pp. 609-611, Dec. 1985.

Heritage, J.P. et al., "Spectral Windowing of Frequency-Modulated Optical Pulses in a Grating Compressor," Applied Physics Letters, vol. 47, No. 2, pp. 87-89, Jul. 15, 1985.

Hill, K. et al., "Fiber Bragg Grating Technology Fundamentals and Overview," Journal of Lightwave Technology, Aug. 1997, vol. 15, No. 8, pp. 1263-1276.

Ibanescu et al., "Analysis of Mode Structure in Hollow Dielctric Waveguide Fibers, "Physical Review E 67, 2003, The American Physical Society.

Jiang, et al., "Fully Dispersion Compensated ~500 fs Pulse Transmission Over 50 km Single Mode Fiber," Optics Letters, vol. 30, No. 12, pp. 1449-1451, Jun. 15, 2005.

Jiang, et al., "Fully Dispersion Compensated ~500 fs Pulse Transmission Over 50 km Single Mode Fiber," Purdue University ECE Annual Research Summary, Jul. 1, 2004-Jun. 30, 2005.

Killey, et al., "Electronic Dispersion Compensation by Signal Predistortion Using Digital Processing and a Dual-Drive Mach-Zehnder Modulator," IEEE Photonics Technology Letters, vol. 17, No. 3, pp. 714-716, Mar. 2005.

Kim, K. et al., "1.4kW High Peak Power Generation from an All Semiconductor Mode-locked Master Oscillator Power Amplifier System Based on eXtreme Chirped Pulse Amplification (X-CPA)", Optics Express, Jun. 2, 2005, pp. 4600-4606, vol. 13, No. 12.

Koechner, "Solid State Laser Engineering", Oct. 29, 1999, Section 5.5, pp. 270-277, 5th Edition, Springer.

Kwon, et al., "Tunable Dispersion Slope Compensator Using a Chirped Fiber Bragg Grating Tuned by a Fan-shaped Thin Metallic Heat Channel," IEEE Photonics Technology Letters, vol. 18, No. 1, pp. 118-120, Jan. 1, 2006.

Kyungbum, Kim et al., "1.4kW High Peak Power Generation from an all Semiconductor Mode-locked Master Oscillator Power Amplifier System Based on eXtreme Chirped Pulse Amplification (X-CPA)", Optics Express, Jun. 2, 2005, pp. 4600-4606, vol. 13, No. 12.

Levy et al., "Engineering Space-Variant Inhomogeneous Media for Polarization Control," Optics Letters, Aug. 1, 2004, pp. 1718-1720, vol. 29, No. 15, Optical Society of America.

Liao, Kai-Hsiu et al., "Large-aperture Chirped Volume Bragg Grating Based Fiber CPA System, "Optics Express, Apr. 16, 2007, vol. 15, No. 8, pp. 4876-4882.

Limpert et al., "All Fiber Chiped-Pulse Amplification System Based on Compression in Air-Guiding Photonic Bandgap Fiber", Optics Express, Dec. 1, 2003, vol. 11, No. 24, pp. 3332-3337.

Lo, S. et al., "Semiconductor Hollow Optical Waveguides Formed by Omni-directional Reflectors", Optics Express, vol. 12, No. 26, Dec. 27, 2004, pp. 6589-6593.

Malinowski A. et al., "Short Pulse High Power Fiber Laser Systems," Proceedings of the 2005 Conference on Lasers and Electro-Optics (CLEO), Paper No. CThG3, pp. 1647-1649, May 26, 2005.

Mehier-Humbert, S. et al., "Physical Methods for Gene Transfer: Improving the Kinetics of Gene Delivery Into Cells," Advanced Drug Delivery Reviews, vol. 57, pp. 733-753, 2005.

Mohammed, W. et al., "Selective Excitation of the TE01 Mode in Hollow-Glass Waveguide Using a Subwavelength Grating," IEEE Photonics Technology Letters, Jul. 2005, vol. 17, No. 7, IEEE.

Nibbering, E.T.J., et al. "Spectral Determination of the Amplitude and the Phase of Intense Ultrashort Optical Pulses," Journal Optical Society of America B, vol. 13, No. 2, pp. 317-329, Feb. 1996.

Nicholson, J. et al., "Propagation of Femotsecond Pulses in Large-mode-area, Higher-order-mode Fiber," Optics Letters, vol. 31, No. 21, 2005, pp. 3191-3193.

Nishimura et al., "In Vivo Manipulation of Biological Systems with Femtosecond Laser Pulses," Proc. SPIE 6261, 62611J, pp. 1-10, 2006.

Noda, J. et al., "Polarization-maintaining Fibers and Their Applications", Journal of Lightwave Technology, vol. Lt-4, No. 8 Aug. 1986, pp. 1071-1089.

Palfrey et al., "Generation of 16-FSEC Frequency-tunable Pulses by Optical Pulse compression" Optics Letters, OSA, Optical Society of america, Washington, DC, USA, vol. 10, No. 11, Nov. 1, 1985, pp. 562-564, XP000710358 ISSN: 0146-9592.

Pelusi, M. et al. "Electrooptic Phase Modulation of Stretched 250-fs Pulses for Suppression of Third-Order Fiber Disperson in Transmission", IEEE Photonics Technology Letters, vol. 11, No. 11, Nov. 1999, pp. 1461-1463.

Pelusi, M. D. et al., "Phase Modulation of Stretched Optical Pulses for Suppression of Third-order Dispersion Effects in fibre Transmission," Electronics Letters, vol. 34, No. 17, pp. 1675-1677, Aug. 20, 1998.

Price et al., "Advances in High Power, Short Pulse, Fiber Laser Systems and Technology", Photonics West 2005, San Jose, California, Jan. 2005, pp. 5709-3720.

Price et al., "Advances in High Power, Short Pulse, Fiber Laser Systems and Technology", Proceedings of SPIE—vol. 5709, Fiber Lasers II: Technology, Systems, and Applications, Apr. 2005, pp. 184-192.

Ramachandran, S., et al., "High-power Amplification in a 2040- μm2 Higher Order Mode," SPIE Photonics West 2007, Post-deadline.

Resan et al., "Dispersion-Managed Semiconductor Mode-Locked Ring Laser", Optics Letters, Aug. 1, 2003, pp. 1371-1373, vol. 28, No. 15, Optical Society of America.

Schreiber, T., et al., "Design and High Power Operation of a Stress-induced single Polarization Single-transverse Mode LMA Yb-doped Photonic Crystal Fiber," Fiber Lasers III: Technology, Systems, and Applications, Andrew J.W. Brown, Johan Nilsson, Donald J. Harter, Andreas Tünnermann, eds., Proc. of SPIE, vol. 6102, pp. 61020C-1-61020C-9, 2006.

Schreiber, T., et al., "Stress-induced Single-polarization Single-transverse Mode Photonic Crystal Fiber with Low Nonlinearity," Optics Express, vol. 13, No. 19, Sep. 19, 2005, pp. 7621-7630.

* cited by examiner

--Prior Art--

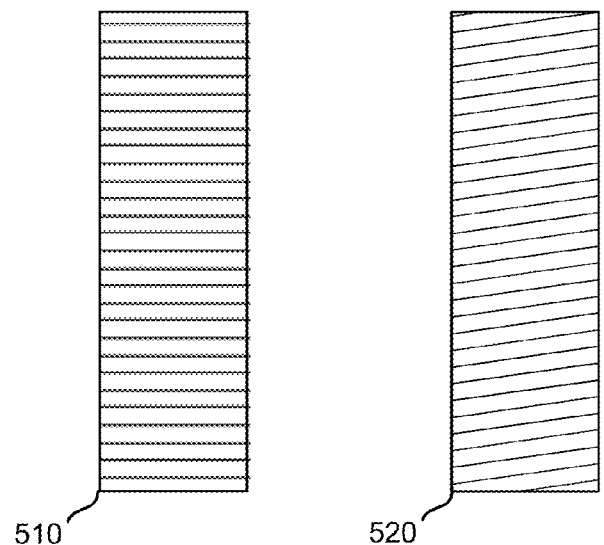
FIGURE 5A
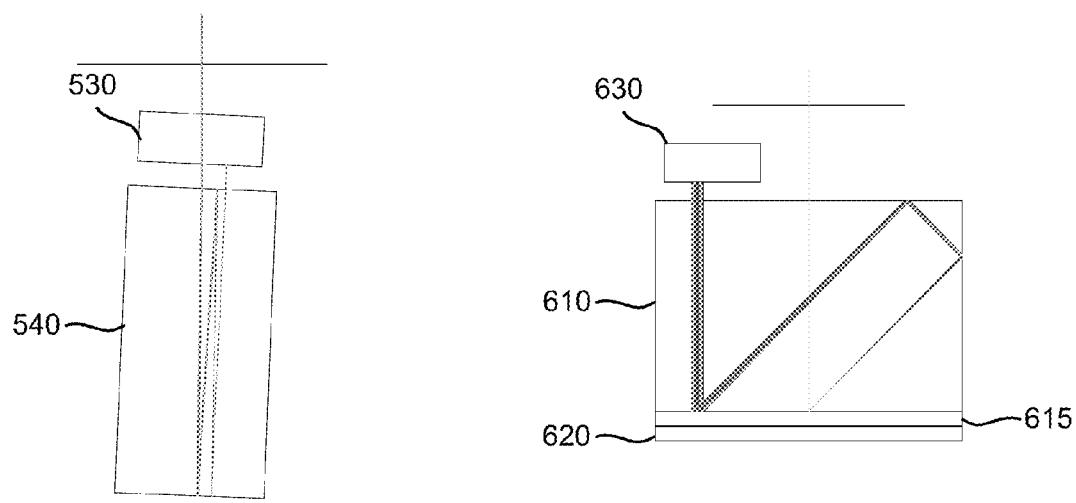
FIGURE 5B
FIGURE 6

COMPACT MONOLITHIC DISPERSION COMPENSATOR

CROSS-REFERENCE TO RELATED APPLICATIONS

The present application claims the priority benefit of U.S. provisional application Ser. No. 61/114,972 filed Nov. 14, 2008 and entitled "Compact Monolithic Dispersion Compensator with Tunable Dispersion," which is incorporated herein by reference

BACKGROUND OF THE INVENTION

An optical signal can include of a continuum of wavelengths over a finite spectral band, or alternately, it may comprise a few discrete wavelengths or spectral bands. Such spectral bands may be used in dense wavelength division multiplexing systems for fiber optic telecommunications. When designing certain optical systems for control of optical signals, it is sometimes advantageous to insure that the different wavelengths of light that pass through the system do so in precisely the same amount of time. Such systems are said to have zero dispersion. Optical systems may also be designed with dispersion such that an optical signal transit time is not the same for all wavelengths of light. A system has negative dispersion if longer wavelengths of light require a longer transit time to pass through the system compared to shorter wavelengths. Similarly, an optical system with positive dispersion requires a longer transit time for shorter wavelengths compared to that of longer wavelengths.

The Treacy compressor is a well-known optical system having negative dispersion, and is commonly employed in the design of ultrashort pulsed laser systems. A traditional Treacy compressor is illustrated in FIG. 1 and includes two separate diffraction gratings 110 and 120 and rooftop mirror assembly 130. Additional mirrors can be employed to route the optical signal into and out of the Treacy compressor, or to fold the optical path within the compressor. In order to function properly, the gratings and mirrors of the Treacy compressor must be carefully positioned and aligned. If not aligned properly, the different wavelengths of light that pass through the Treacy compressor system do not arrive at the same physical location upon exiting the system (a defect known as spatial chirp) or the exact dispersion (wavelength-dependent transit time) will not match the design goal.

The dispersion produced by the traditional 2-grating Treacy compressor can also be achieved with a single grating system that utilizes an extra rooftop mirror assembly in the optical path. This layout is known as a single-grating or 1-grating compressor. The 1-grating compressor, while simpler than the traditional 2-grating compressor, still requires meticulous positioning and alignment of the grating and rooftop mirror assemblies for proper function and to avoid the defects mentioned above. Additionally, both the 2-grating and 1-grating embodiments of the Treacy compressor suffer from susceptibility to misalignment over time due to shifts in spatial orientation or position of the various optomechanical elements in relation to one another. Element shifts can be caused by environmental factors such as temperature change, mechanical shock or vibration, shrinkage of epoxies or adhesives used within the system, or simple mechanical creep and stress relaxation of the various parts of the system.

An optical system that produces a desired amount of dispersion while requiring less alignment and being less susceptible to misalignment shift over time would be advantageous.

SUMMARY OF THE INVENTION

An optical signal control system constructed from a portion of a material allows for a controlled amount of negative dispersion to be generated across a broadband input signal. Laser systems that utilize the optical signal control system may have reduced size and weight as compared to existing compressors and be more robust against misalignment. The optical signal control system may include a block of material suitable for propagation of an optical signal. The block may be made of a single portion of the material and have surfaces with reflective, transmissive, and/or diffractive optical characteristics. By adjusting the physical dimensions of the block substrate and the line pitch of a diffraction grating etched into a surface of the block, the magnitude of the dispersion can be varied. By generating the optical signal control system from a single portion of material, initial alignment is simplified and operation is more stable over environmental conditions. The compact and monolithic design allows for the optical signal control system to maintain stability for optical path lengths.

An embodiment of an optical signal control system includes a portion of a material having a first side and a second side. The portion of the material allows propagation of an optical beam within the block of material. The first side of the plurality of sides includes a diffractive surface for diffracting an optical beam received by the block of material. The second side of the plurality of sides includes a reflective surface to reflect the beam within the block of material after diffraction by the diffractive surface.

An embodiment of an optical signal control system includes a structure defined by a plurality of walls, at least one reflective surface and at least one additional reflective surface. At least one wall comprises a diffractive surface for diffracting a beam received by the structure. The at least one reflective surface is configured to reflect the beam after diffraction by the diffractive surface. The at least one additional reflective surface is configured to reflect the beam toward a secondary diffraction at the diffractive surface.

An embodiment for controlling an optical signal receives an optical signal by a block of material. The block has a plurality of sides and is able to allow propagation of an optical signal within the block. The optical signal is diffracted within the block by a diffraction surface of the block. The diffracted optical signal is reflected within the block by a first reflective surface. The diffracted optical signal directed by the first reflective surface is reflected within the block by a second reflective surface.

An embodiment for fabricating a block for propagating an optical signal grinds a slab to polish one or more edges of the slab. An anti-reflective coating is applied to a first surface of the slab. A grating surface is created on a second surface of the slab. The slab is cut into a plurality of blocks able to propagate an optical signal within each block.

BRIEF DESCRIPTION OF THE DRAWINGS

FIG. 5A is a set of grating lines with correct orientation and incorrect orientation.

FIG. 5B is an exemplary optical signal control system and reflective element configured with compensating tilt.

FIG. 6 is an exemplary optical signal control system with a substrate for diffraction.

DESCRIPTION OF EXEMPLARY EMBODIMENTS

Figure 1:
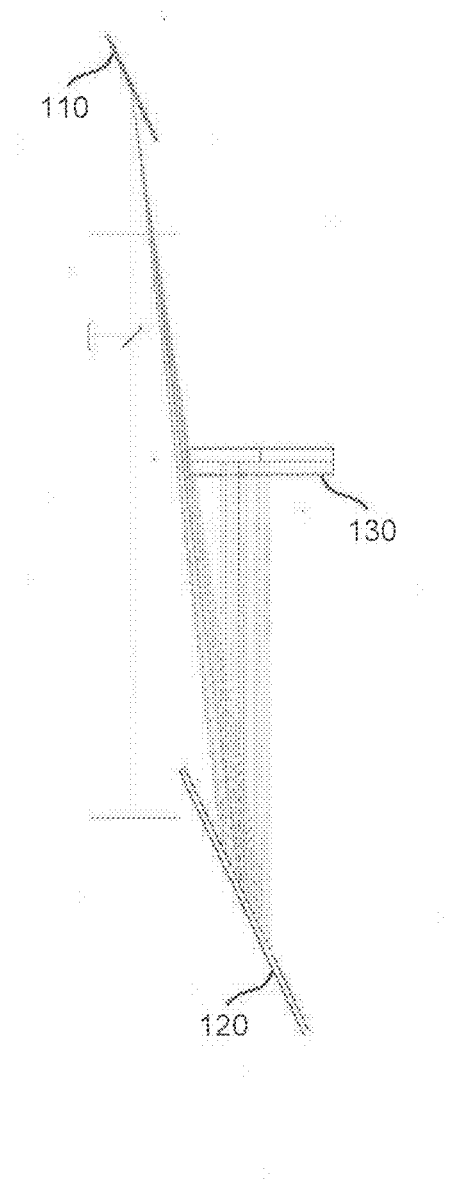
FIG. 1 is a two grating one mirror Treacy compressor of the prior art.

An optical signal control system constructed from a portion of a material allows for a controlled amount of negative dispersion to be generated across a broadband input signal. Laser systems that utilize the optical signal control system may have reduced size and weight as compared to existing compressors and be more robust against misalignment. The optical signal control system may include a block of material suitable for propagation of an optical signal. The block may be made of a single portion of the material and have surfaces with reflective, transmissive, and/or diffractive optical characteristics. By adjusting the physical dimensions of the block substrate and the line pitch of a diffraction grating etched into (or otherwise applied to) a surface of the block, the magnitude of the dispersion can be varied. By generating the optical signal control system from a single portion of material, initial alignment is simplified and operation is more stable over environmental conditions. The compact and monolithic design allows for the optical signal control system to maintain stability for optical path lengths.

The dispersion of the optical signal control system may be configured or fine-tuned after fabrication. Each wavelength of an optical signal propagates in a different direction in a dispersive optical path within a block of a single material, such as glass or silica. Because the propagation is mostly, if not entirely, taking place within the block of the material, the signals are not susceptible to air currents and other environmental effects and therefore are far less susceptible to misalignment.

An adjustable reflection device such as a mirror may be included in the optical path to vary the length of the dispersive section of the optical signal. The optical signal control system may also utilize a second portion of material in addition to and in optical communication with the first portion of material (the block of material). The first and second portions of material may be optically coupled to each other with the adjustable reflection device within the optical communication line. The optical signal control system with an adjustable reflection device may also be designed to more efficiently utilize grating surfaces.

The optical signal control system may be implemented in any of several shapes and sizes. In exemplary embodiments, the optical signal control system may be implemented as a monolithic compressor having a single rectangular-shaped glass block. One advantage of the present optical signal control system is that the dispersive characteristics of the monolithic compressor do not require time-consuming adjustments—they are inherent to the physical geometry of the device.

The optical signal control system may utilize transmission grating for easy tuning of an angle at which light arrives on the grating (angle of incidence). The ability to adjust the angle at which light hits grating may be used to optimize the pulse quality of laser. A reflective device such as a rooftop mirror may be utilized to operate with the monolithic system, separated and affixed or secured with plates or some other securing mechanism. Attachment schemes allow for adjustable reflection elements (rooftop mirror and adjustable mirror) to be freely adjusted laterally, tip and tilt. Once aligned, the block and reflective device can be integrated together into a monolithic assembly.

The substrate for propagating optical signals may be comprised of a single portion of a material, such as a block of material. The block of material may be in the form of a rectangular shape, trapezoidal shape, or some other shape. Though references are made to a block which forms a monolithic compressor, the use of block is not intended to limit the size or shape of the optical signal control system. Moreover, additional elements may be attached or affixed to the block to form a monolithic system which includes more than the block itself.

Monolithic Pulse Compressor

Figure 2:
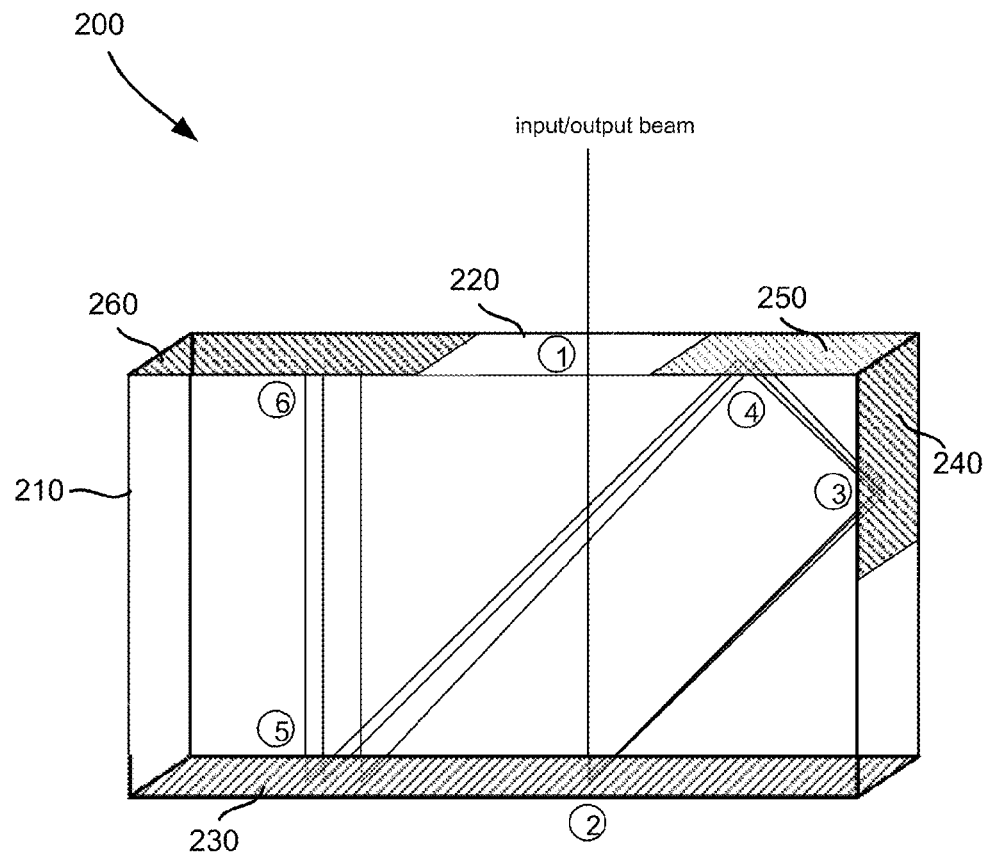
FIG. 2 is an exemplary optical signal control system.

FIG. 2 is an exemplary optical signal control system 200. Optical signal control system 200 includes a block 210. The block 210 may include a single portion of a material and have a structure that includes a plurality of sides or walls. In some embodiments, the block may be fabricated from a solid block of material such as glass or silica. Block 210 may include an anti-reflective (AR) coating 220, diffractive surface 230, total internal reflection (TIR) surfaces 240 and 250, and reflective coating 260. One or more surfaces of the block/portion of material may be polished. In some embodiments, only edges of the glass block may need to be polished; the front and rear faces of the block may be left unpolished.

An optical signal may propagate between surfaces within block 210. As illustrated in FIG. 2, an optical signal enters the block 210 through an edge of the block which may have an AR coating 220. The anti-reflection coating may be applied at the entry surface for improved optical efficiency. The optical beam propagates through block 210 and reflects off diffractive surface 230 at point (2). A diffractive surface such as a ruled grating may be created at a block edge opposite to the optical signal entry edge such that a plane of diffraction is parallel to the front and rear faces of the glass block. The diffractive surface may be reflective, such as by utilizing gold, aluminum, or silver, or by applying a multilayer dielectric reflective grating structure to this surface. The grating pitch on diffractive surface 230 can be chosen such that the first diffracted order propagates as illustrated toward one of the upper corners of the block. The grating may be blazed to optimize the diffraction efficiency into the desired diffraction order.

The propagating optical signal reflects from diffractive surface 230 to surface 240 and thereafter to surface 250. The grating pitch for grating surface 230 may be chosen which results in TIR of the diffracted beam at reflective surface 240 and reflective surface 250. When TIR is configured to occur at surfaces 240 and 250, no reflective coating needs to be applied to block 210. After the two TIR reflections, the optical signal travels toward the diffractive surface 230 at a location (5) that is laterally shifted from the initial diffractive reflection point (2). The wavelengths of the optical signal, now spatially dispersed, may propagate toward the top edge within block 210 in a direction parallel to a surface normal. The optical signal may then be retro-reflected by the high reflection coating 260. The HR coating 260 is applied to the upper edge of the glass block and may include a metalized or multilayer dielectric coating. Following the retro-reflection, the optical signal retraces the entire path within block 210 to diffractive surface 230, reflective surfaces 250 and 240, and back to diffractive surface 230. The optical signal then reemerges collinear with the input optical signal but in opposing direction through AR surface 220.

In some embodiments, accurate parallelism of the upper (1, 6) and lower (2, 5) edges of block 210, as well as perpendicularity of the side TIR edge (3) of the block 210 may be critical to achieve low spatial chirp in the output optical signal of a monolithic compressor. Precision optical fabrication methods such as double-sided polishing and lapping and optical contact blocking of substrates can optionally be employed in the fabrication of the monolithic compressor to achieve the required angular tolerances of a few seconds of arc in the finished glass block. Fabrication of an optical signal control system is discussed with respect to FIGS. 17A-B.

In some embodiments, the grating pitch may not be constrained by the need to maintain TIR conditions at one or both of the reflections (3) and (4) within block 210. A reflective coating may be applied as required to one or both of the surfaces 240 and 250 of the block so that the optical signal is reflected by the coating, as opposed to TIR, at both of these locations.

Figure 3:
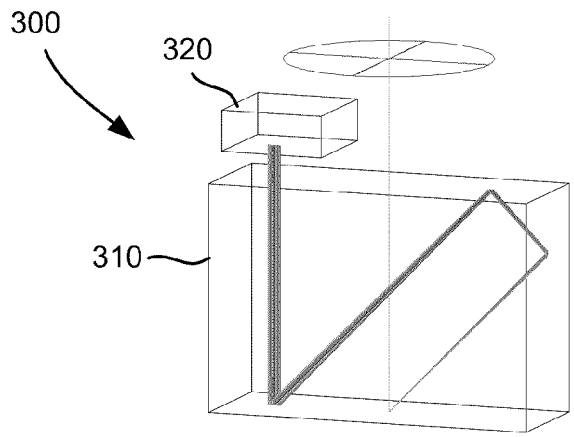
FIG. 3 is an exemplary optical signal control system with a reflective element.

In some embodiments, the optical signal does not reflect at surface 260 of the block 210. Rather, the optical signal refracts back into the incident medium (for example, air) at the interface with block 210. FIG. 3 is an exemplary optical signal control system 300 with a reflective element that receives a refractive optical signal from a block 310. Optical signal control system 300 includes block 310 and reflective element 320. Block 310 is optically coupled to reflective element 320 in that optical signals may travel between block 310 and reflective element 320.

Reflective element 320 may be a mirror positioned above the block. The reflective element 320 may be aligned relative to the monolithic compressor block in order to compensate for angular errors in the block that occur from typical optical component fabrication tolerances.

Figure 4A:
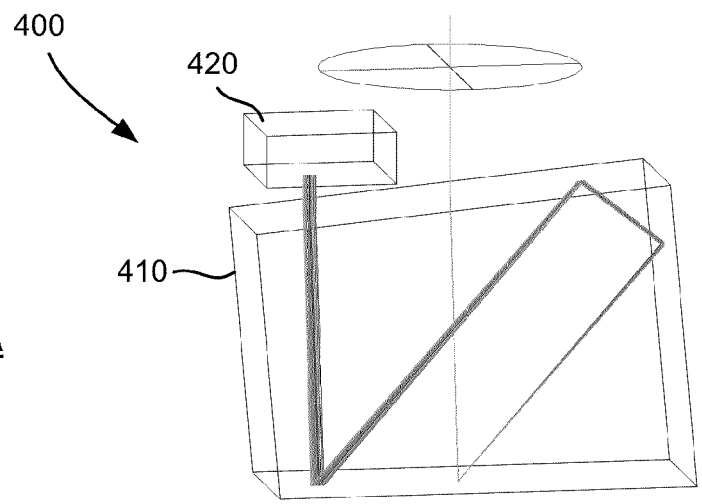
FIG. 4A is an exemplary optical signal control system fabricated with an angular offset.

By using a reflective element to compensate for angular errors, certain fabrication tolerances of the block can be relaxed, reducing its manufacturing costs. An additional benefit of this embodiment is that low spatial chirp can be maintained in the overall system without requiring tightly controlled parallelism between the upper and lower edges of the block. This low spatial chirp allows the block to be fabricated with an amount of angular offset, or wedge, whether intentional or not, between the upper and lower edges of the block. FIG. 4A is an exemplary optical signal control system fabricated with an angular offset. As shown, the edge near the reflective element is shorter in length than the opposite edge in the block 410, resulting in a wedge shaped portion. The wedged shaped portion has five degrees of wedge between the upper and lower polished edges. Use of reflective element 420 with block 410 having the angular offset may compensate for the angular error due to the wedge.

Such wedge shaped optical signal control systems may be beneficial to eliminate a Fabry-Perot etalon effect that would add undesirable amplitude and phase ripple to the optical response of a monolithic compressor. In practice, such large wedge would not be necessary, but this illustrates the ability of the device to operate with low spatial chirp in the presence of significant wedge between the upper and lower edges.

Figure 4B:
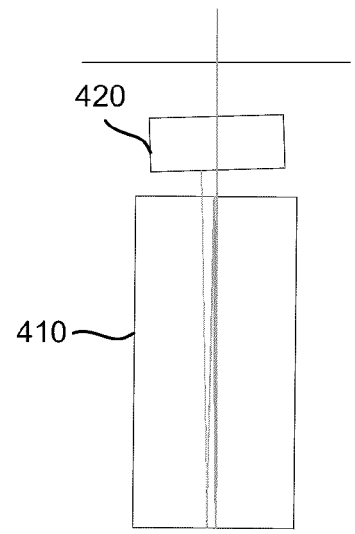
FIG. 4B is an exemplary compensated optical signal control system and reflective element.

In the block 410 of FIG. 4A, the wedge is oriented in the plane of diffraction. It is also possible that fabrication errors may result in wedge oriented orthogonal to the plane of diffraction. In this case, the auxiliary retro-reflector can be tilted slightly to compensate for out-of-plane skew ray propagation that results, and recover the collinearity of input and output beams. Even for a wedge-shaped system in this orientation of as large as 30 arc minutes (a very generous fabrication tolerance), the angular compensation results in spatial chirp of less than 20 microns, a tiny fraction of the overall beam diameter of the optical signal, and therefore a negligible impact on functional performance of the monolithic compressor. FIG. 4B is an exemplary schematic diagram of a compensated monolithic compressor with 30 arc minutes of wedge orthogonal to the diffraction plane (as viewed along the plane of diffraction to illustrate the compensation scheme).

Another possible fabrication error is non-orthogonality of the diffraction grating lines relative to the edges of the glass block. FIG. 5A illustrates a set of grating lines with correct orientation on the left and incorrect orientation on the right. Errors of this type result in a lateral shift of the output signal relative to the input signal, and also cause spatial chirp in the output beam. Such fabrication errors may be compensated by tilting both the block and the reflective element to minimize the lateral shift of the output signal relative to the input signal. The compensated system may still exhibit a small amount of spatial chirp, but this is tolerable provided that the magnitude of this fabrication error is minimized. FIG. 5B illustrates a monolithic compensator (i.e., block 540) having this type of manufacturing defect with appropriate compensating tilts of the block 540 and retro-reflector 530 (exaggerated in FIG. 5B for purposes of discussion and to illustrate the compensating tilt adjustments).

Reflective elements can direct optical signals in directions other than back at a block. The reflective element of FIG. 3 may be replaced by a reflective assembly, such as a rooftop mirror assembly, so that the returning optical signal is spatially separated from the input optical signal. This configuration enables the returning optical signal to be routed separately from the input optical signal (using mirrors, prisms, or similar optical elements) after it reemerges or refracts from the block.

In another embodiment, a phase plate is positioned for dispersion of the optical signal. FIG. 6 is an exemplary optical signal control system with a substrate for diffraction. The optical control signal includes a block 610 and substrate 620 bonded either directly onto the block 610, between block 610 and a separate reflective element, or directly to the reflective surface of the reflective element. A diffraction grating may be applied to the separate substrate 620 attached to monolithic block 610, thereby eliminating the need to etch the grating directly into block 610. A phase plate 615 to manipulate high order dispersion may be interposed between the block 610 and the retro-reflective element 630. The substrate can manipulate the higher order dispersion characteristics of the monolithic compressor. In another embodiment, the diffractive structure is not applied directly onto the glass block, but is optionally applied to a separate substrate that is bonded to the lower edge of the glass block.

In some embodiments of mode-locked laser (MLL) designs, a dispersive optical element may be included within the laser's resonant cavity in order to balance the dispersion of the overall resonant cavity and achieve desired characteristics of the MLL output signal. In the case of mode-locked fiber lasers designed for producing a pulsed output optical signal having a central wavelength near 1 micron, proper balancing of dispersion within the resonant cavity may not be achieved without introducing a small amount of negative dispersion within the cavity. Negative dispersion may be introduced using a length of specially fabricated optical fiber having the correct amount of negative dispersion. Such negative dispersion fiber is not readily available for optical signals having a central wavelength near 1 micron due to lack of availability of optical materials with the dispersive characteristics that would be necessary to design and fabricate such fiber. The resonant cavity of a fiber-based MLL is typically several meters in length. For such resonant cavities, negative dispersion may be added to the laser cavity through some means in the amount of a few hundred femtoseconds per nanometer. A monolithic compressor of the design disclosed herein may be designed to produce negative dispersion of this magnitude. Such a monolithic compressor may be constructed of a substrate material of Schott BK7 optical glass, have dimensions of approximately 11 mm (H)×16 mm (W), and have sufficient depth to accommodate the full dimension of the input optical signal without vignetting, and large enough to facilitate accurate fabrication. The grating line pitch may be 1000 lines per millimeter. The calculated dispersion characteristics may be as follows:

TABLE 1

MLL Dispersion Characteristics

| D | 0.289 | ps/nm |
|---|---|---|
| S | 0.001 | ps/nm$^2$ |
| C | 6.145E−06 | ps/nm$^3$ |
| dC/dλ | 4.842E−08 | ps/nm$^4$ |
| d$^2$C/dλ$^2$ | 7.915E−10 | ps/nm$^5$ |

The retro-reflective device will configure the input and output optical signals to be collinear and propagating in opposite directions. In an exemplary embodiment, to separate the input and output signals, a fiber optic circulator may be used with a free space coupler at a port 2 output of the circulator and the monolithic compressor. The collimated free space optical signal is then aligned to the input axis of the monolithic compressor such that the returning positively dispersed optical signal is recoupled into the optical fiber at the same free space coupler. In another embodiment, a Faraday isolator is used in conjunction with the optical signal control system (compressor) for separating the input and output signals.

The geometry of the monolithic compressor is not limited to devices with small amounts of dispersion. For example, chirped pulse amplification (CPA) systems may use a larger amount of positive dispersion—for example, on the order of several 10's, or even 100's of picoseconds per nanometer—to stretch the output pulses of a MLL prior to amplification. Such large stretch factors may minimize nonlinear behavior of the optical media through which the optical signal travels as it is amplified. In these systems, pulse compressors typical of the Treacy design or its variants are used to recompress the amplified pulses. These pulse compressors are typically bulky, difficult to align, and susceptible to all the instabilities in alignment and thermal or mechanical drift that are discussed above.

Figure 7A:
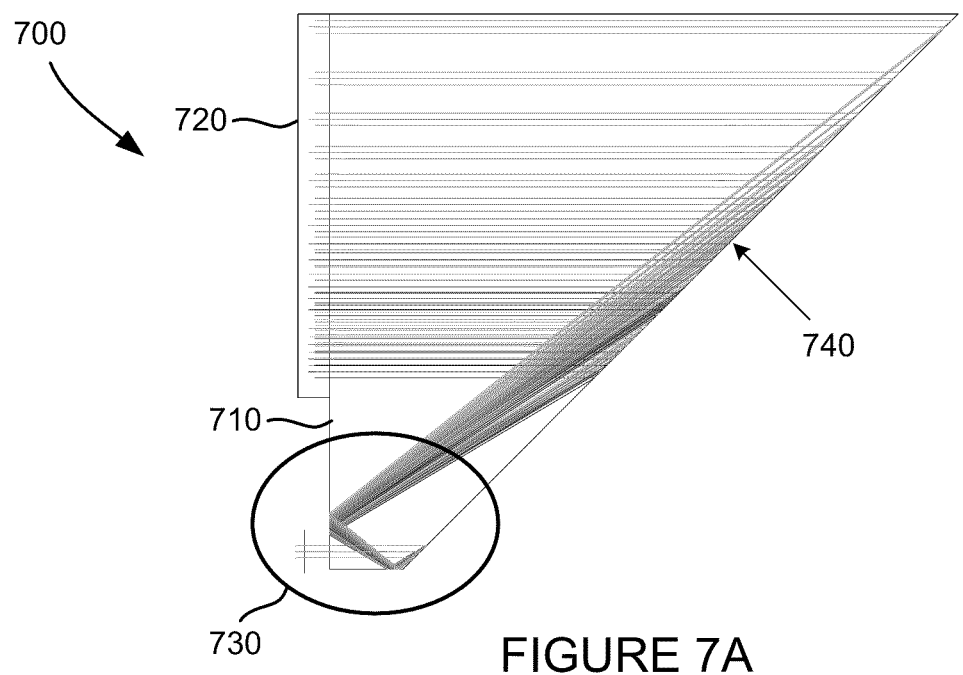
FIG. 7A is an exemplary optical signal control system with a larger dispersion.
Figure 7B:
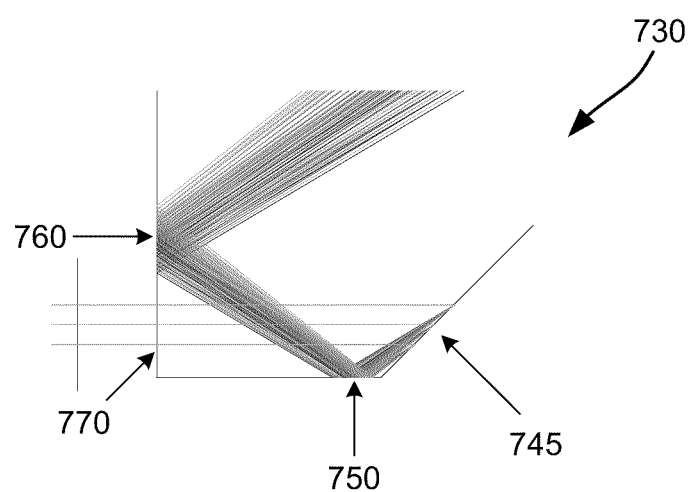
FIG. 7B illustrates a portion of the optical signal control system with a larger dispersion.
Figure 7C:
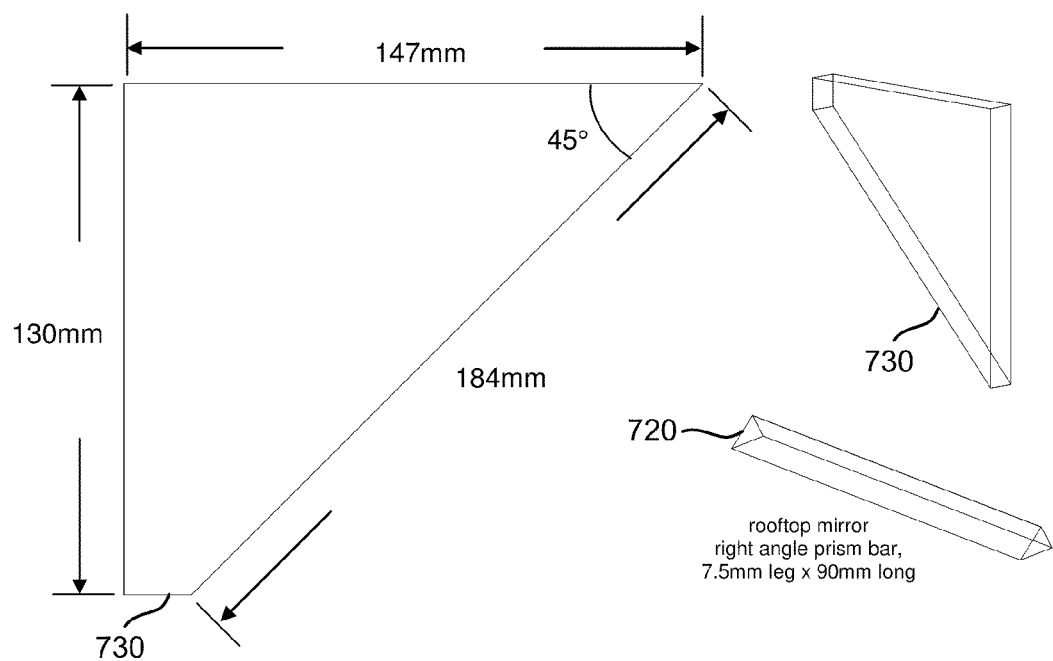
FIG. 7C illustrates dimensions of the optical signal control system with a larger dispersion.

FIG. 7A is an exemplary optical signal control system 700 with a larger dispersion. Optical signal control system 700 includes a block 710 and a rooftop mirror prism 720. An embodiment of this design has a grating on the diffractive surface with a groove density of 2400 grooves per millimeter, and physical dimensions as illustrated in FIG. 7C. The substrate of this specific embodiment may be Schott BK-7 or any material having good optical transparency at the operating wavelength and that is capable of being fabricated and polished to the required optical tolerances. As shown in FIG. 7B, the optical signal may be reflected at multiple surfaces within block 710. For example, the incoming optical signal may be diffracted at surface 745, the diffracted signal can be reflected by TIR surface 750 and by a highly reflective coating at surface 760. The surface 710 may be treated with an AR coating to prevent reflection of the incoming optical signal.

The dispersion characteristics of this specific design are shown in Table 2 below and can be adjusted through careful selection of the grating pitch, the glass type, and the dimensions and angles of the glass block.

TABLE 2

Grating Compressor Dispersion Characteristics

| GVD | −55.727 | ps$^2$ |
|---|---|---|
| TOD | 4.348 | ps$^3$ |
| FOD | −5.846E−01 | ps$^4$ |
| FiOD | 1.088E−01 | ps$^5$ |
| SiOD | −1.478E−02 | ps$^6$ |
| D | 93.488 | ps/nm |
| S | 12.061 | ps/nm$^2$ |
| C | 2.691 | ps/nm$^3$ |
| dC/dλ | 8.3081E−01 | ps/nm$^4$ |
| d$^2$C/dλ$^2$ | 1.805E−01 | ps/nm$^5$ |

The rooftop prism 720 may optionally be bonded to the block 710 with optical adhesive or optically contacted to block 710. In an alternate embodiment, the rooftop prism 720 remains physically separated from block 710 with a small air gap, and AR coatings are optionally applied to the air-glass interfaces on the top of block 710 and hypotenuse surface of the rooftop prism 720 for improved efficiency.

In an embodiment, a rooftop prism 720 may be replaced by a high reflective coating applied to the top of block 210 at the location where the optical signal would ordinarily pass from block 710 into the rooftop prism 720. In this design, the optical signal retro-reflects back on itself and a Faraday isolator may be used to spatially separate the input and output optical signals outside of block 710.

The design of the monolithic compressor may be adjusted by changing the grating pitch or the substrate dimension of the glass block so that the overall dispersion is larger or smaller. The device could find useful application in any system where a thermally and mechanically stable source of negative optical dispersion is needed, for example to compress ultrashort optical pulses that have been stretched via positive dispersion, or to provide higher order dispersion compensation.

Pulse Compressor with Tunable Dispersion

In some embodiments, the dispersion of a compressor of the present technology may be fine-tuned. Tuning the dispersion of a compressor may be advantageous because manufacturing tolerances may lead to variability in the dispersion of pulse stretcher devices, non-linearities in the various amplification stages of a chirped pulse amplifier may impart undesirable wavelength-dependent phase shifts on the signal, and the monolithic compressor device may also suffer from manufacturing variations that lead to variability in its dispersion. These effects serve to create random variations in the net dispersion of a CPA laser system. In order to produce the shortest possible pulses from a CPA laser system, the end-to-end dispersion of the system should be carefully balanced. This balancing is typically accomplished by fine tuning the dispersion of the compressor. This is especially true when the pulse-stretching function is accomplished with an optical fiber-based stretching device. Such fiber-based stretcher devices may be tuned over a very limited range, often through externally applied changes to the stretcher operating temperature or by applying mechanical stress.

In contrast, the dispersion of a traditional Treacy-style compressor is easily tuned over a wide adjustment range by changing the optical path length in the dispersive section of the optical path. Because the entire dispersive path of the previously disclosed monolithic compressor may be contained within a glass substrate of the device, the dispersion of the device is an intrinsic property that results from the physical dimensions and refractive index of the glass substrate and the line pitch of the diffraction grating. As a result, unlike a traditional Treacy compressor, the dispersion of this device may not be freely adjusted.

Figure 8A:
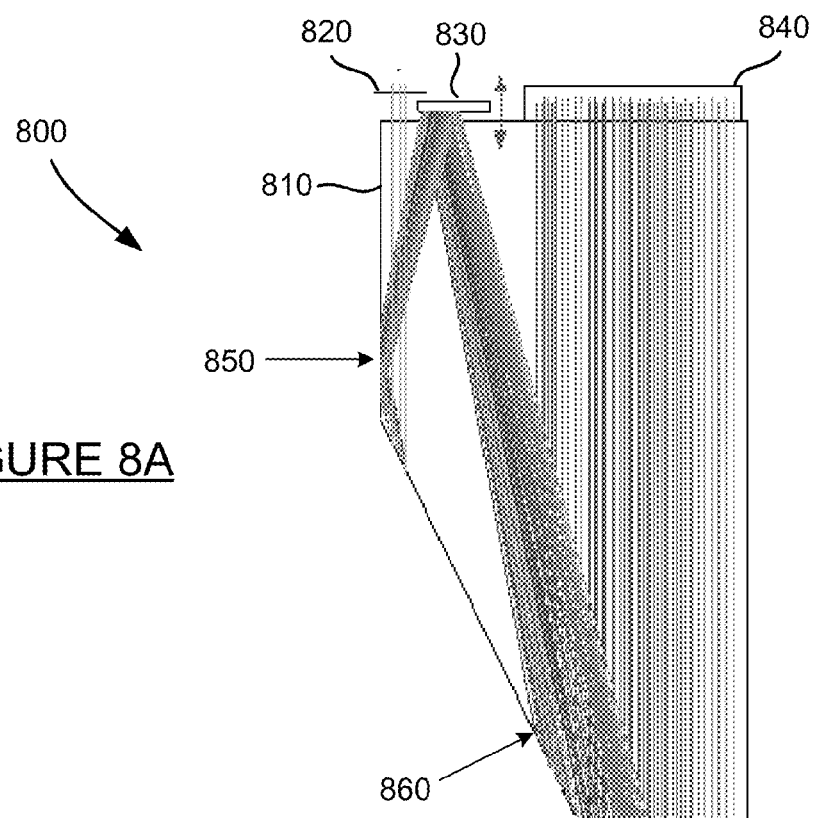
FIG. 8A is an exemplary optical signal control system with tunable dispersion.

FIG. 8A is an exemplary optical signal control system 800 with tunable dispersion. The system of FIG. 8A embodies advantages of the compressor of FIGS. 7A-C while being able to change or fine-tune system dispersion after the system is fabricated to balance the overall dispersion of the laser system into which it is installed. The system of FIG. 8A includes block 810, prism 840 and adjustable reflection element 830. The adjustable reflection element may include any element able to reflect an optical signal, such as an adjustable reflection mirror.

The system 800 of FIG. 8A may retain the compactness and integrated, monolithic construction of the non-adjustable design of FIG. 7A with the exception of an adjustable reflection element (e.g., adjustable reflection mirror) included in the optical path to enable the optical path length to be varied along the dispersive section of the beam trajectory. Additionally, the previous, non-adjustable device may be designed with BK7 as the glass material, although the selection of glass material is limited only by the need to have high transparency at the operating wavelength. The system 800 of FIG. 8A may be based on a design utilizing fused silica as the substrate material. This material has the advantage of extremely high optical transparency at wavelengths near 1550 nm, and has a very small coefficient of thermal expansion as compared to BK7 and many other common optical glasses.

The system 800 includes a TIR reflection surface 850 and diffraction surface 860. The choice of grating line pitch and incidence angle must be selected to avoid TIR at the location where the beam exits block 810 just below reflecting element 830. In the non-adjustable embodiment, it is desirable—although not mandatory—to maintain the TIR condition at this location to avoid a need for coating this region with a multi-layer dielectric or metallic reflective film. The grating line pitch may be 1740 lines/mm and the incidence angle of the beam on the grating may be 64 degrees. The grating line pitch and incidence angle may be selected to insure that a suitable diffracted order manifests to generate dispersion and causes the signal to propagate along the full optical path of the compressor, but apart from those requirements, may be chosen from a continuum of line pitch and incidence angle values to generate the required amount of dispersion. Grating manufacturers typically have tooling and processes established for certain specific, discrete grating line pitches. Hence, the grating line pitch may be chosen from a pre-existing value for which tooling and processes exist. The illustrative embodiment included in system 800 of FIG. 8A adheres to this guideline, as 1740 lines/mm is a commonly available line pitch from multiple existing commercial vendors of diffraction gratings.

TABLE 3

Grating Compressor Dispersion Characteristics

| GVD | −125.355 | $ps^2$ |
|---|---|---|
| TOD | 10.646 | $ps^3$ |
| FOD | −1.505E+00 | $ps^4$ |
| FiOD | 2.978E−01 | $ps^5$ |
| SiOD | −7.468E−02 | $ps^6$ |
| D | 98.035 | ps/nm |
| S | 6.385 | $ps/nm^2$ |
| C | 6.951E−01 | $ps/nm^3$ |
| $dC/d\lambda$ | 1.059E−01 | $ps/nm^4$ |
| $d^2C/d\lambda^2$ | 2.045E−02 | $ps/nm^5$ |

The exemplary dispersive characteristics of system 800 of FIG. 8A are shown in table 3 above. These characteristics may be adjusted through careful selection of various design parameters in alternative embodiments. Block 810 may have an overall length of about 227 mm and width of about 80 mm. The thickness may be about 16 mm, which is also the length of the hypotenuse on the right angle prism bar that serves as the rooftop mirror for the collimated, dispersed beam.

To minimize spatial chirp, the separate adjustable mirror that enables dispersion tuning of the device may be aligned in pitch and yaw so that an accurate right angle is formed by the reflective surface of that mirror and the side wall of the block (e.g., the monolithic block) where the signal undergoes TIR. In the block 710, this right angle is formed between the TIR surface and the adjacent face of block 710 that serves as the input and output surface. As a result, the system of FIG. 7A may require narrow manufacturing tolerances on the polished faces of the monolithic block to avoid spatial chirp. Hence, because the adjustable reflection element 830 can be aligned in pitch and yaw to minimize spatial chirp, a significant advantage of the adjustable embodiment of the system of FIG. 8A is that the fabrication tolerances on the polished faces of the monolithic block can be relaxed as compared to other designs.

Figure 9A:
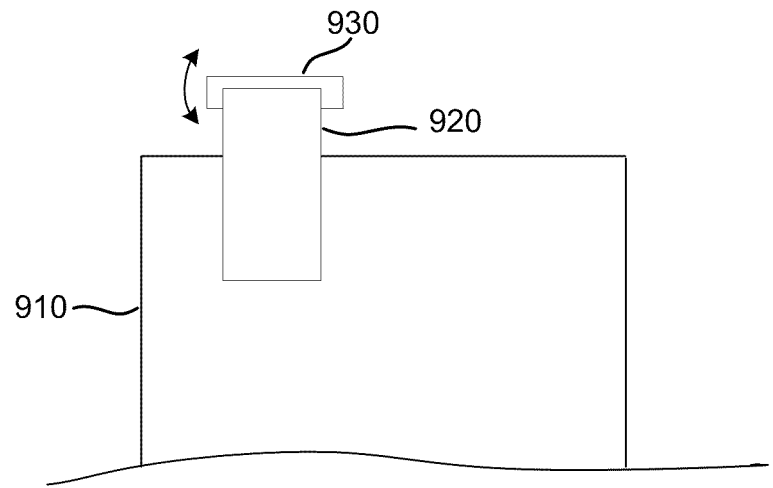
FIG. 9A illustrates a front view of a mounting mechanism for a path length adjustment element.
Figure 9B:
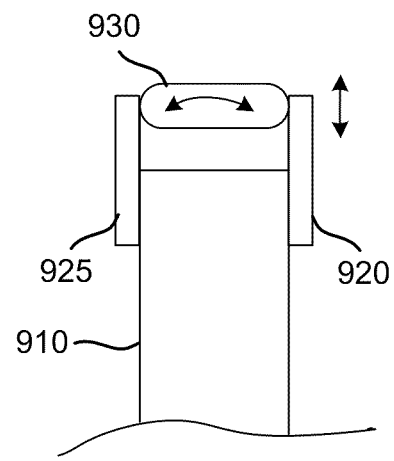
FIG. 9B illustrates a side view of a mounting mechanism for a path length adjustment element.

Once the adjustable reflection element 830 (e.g., adjustable mirror) has been aligned and positioned to minimize spatial chirp and optimize the dispersion balancing of the system, it may be affixed in place, or mounted, so that the overall assembly is mechanically and thermally stable. There are many approaches to mounting an adjustable reflection element 830. FIGS. 9A and 9B illustrate a front view and side view of a mounting mechanism for an adjustable reflection element 830. It should be noted that the scope of the invention is not intended to be limited in any way by the suggested mounting method that is illustrated, but rather is intended to encompass any embodiment of the overall concept that includes a stable mounting provision for the adjustable mirror.

In a mounting mechanism illustrated in FIGS. 9A and 9B, all the plates of the assembly—block 910, adjustable reflection element 930, and mirror mounting blocks 920 and 925—may be fabricated from the same substrate material (e.g., from the material the block was fabricated from) so that they all have a common thermal expansion coefficient, and the adhesive material may be chosen for high glass transition temperature and good thermal stability. This may minimize thermally induced alignment drift of the assembly.

In an embodiment, the adjustable reflection element may not be affixed to the monolithic compressor block, but is instead mounted to a separate linear stage so that its position relative to the monolithic compressor block may be adjusted smoothly and continuously over a range of travel.

The linear stage may have a manual adjustment, or it may alternately have a motorized adjustment. In the latter case, the motorized adjustment may optionally be controlled by a closed-loop servo system with a feedback signal derived from a system that monitors the pulse width of the laser or that monitors any other signal that is proportional to the pulse width of the laser.

Figure 10A:
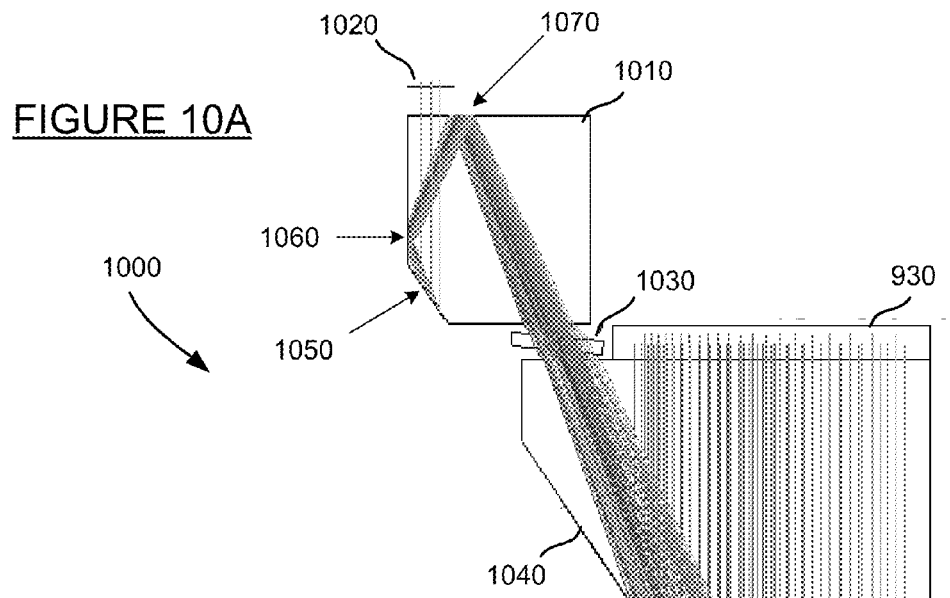
FIG. 10A is an exemplary two portion optical signal control system.
Figure 10B:
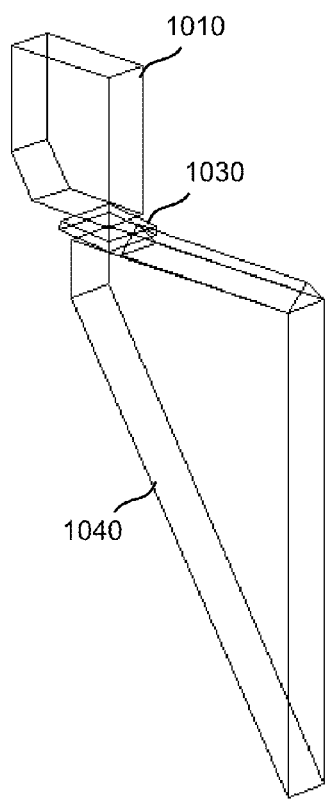
FIG. 10B is another view of a two portion optical signal control system.

FIG. 10A is an exemplary two portion optical signal control system. The system of FIG. 10A allows the dispersion of the compressor to be adjusted in situ after the overall laser system is assembled. The system of FIG. 10A includes first portion 1010, second portion 1040, and tuning block 1030. Dispersion surfaces 1050 and 1080 reside on portions 1010 and 1040, respectively. A highly reflective (HR) coating may be applied to surface 1070 to reflect the optical signal which is reflected by TIR at surface 1060. The system of FIG. 10A has a monolithic block divided into two separate portions 1010 and 1040 such that the dispersive beam path now passes through an air gap between the two sections of the compressor. A tuning block 1030 is positioned in the air gap such that it intercepts the optical signal communication between the blocks 1010 and 1040. Coarse adjustment to dispersion of the system of FIG. 10A may be accomplished by increasing or decreasing the distance between the two main sections of the compressor. Fine adjustments to dispersion can be accomplished by slight tilts of the tuning block. Additionally, it is possible to vary the ratio of GVD to higher order dispersion terms by choosing the optical material for the tuning block with appropriate bulk dispersive characteristics. The tuning block 1030 may be an actively adjustable phase plate such as a liquid crystal retarder, thereby enabling real-time adjustment of the dispersion. Similarly, the tuning block 1030 may be a single or multi-cavity thin film band pass filter having specifically engineered phase response, thereby providing additional means to control the overall device dispersion. Manual or motor controlled linear stages may optionally control relative positions of the components for in situ control of dispersion as described above.

Compressor with Efficient Space Utilization of Grating Surface

Figure 11:
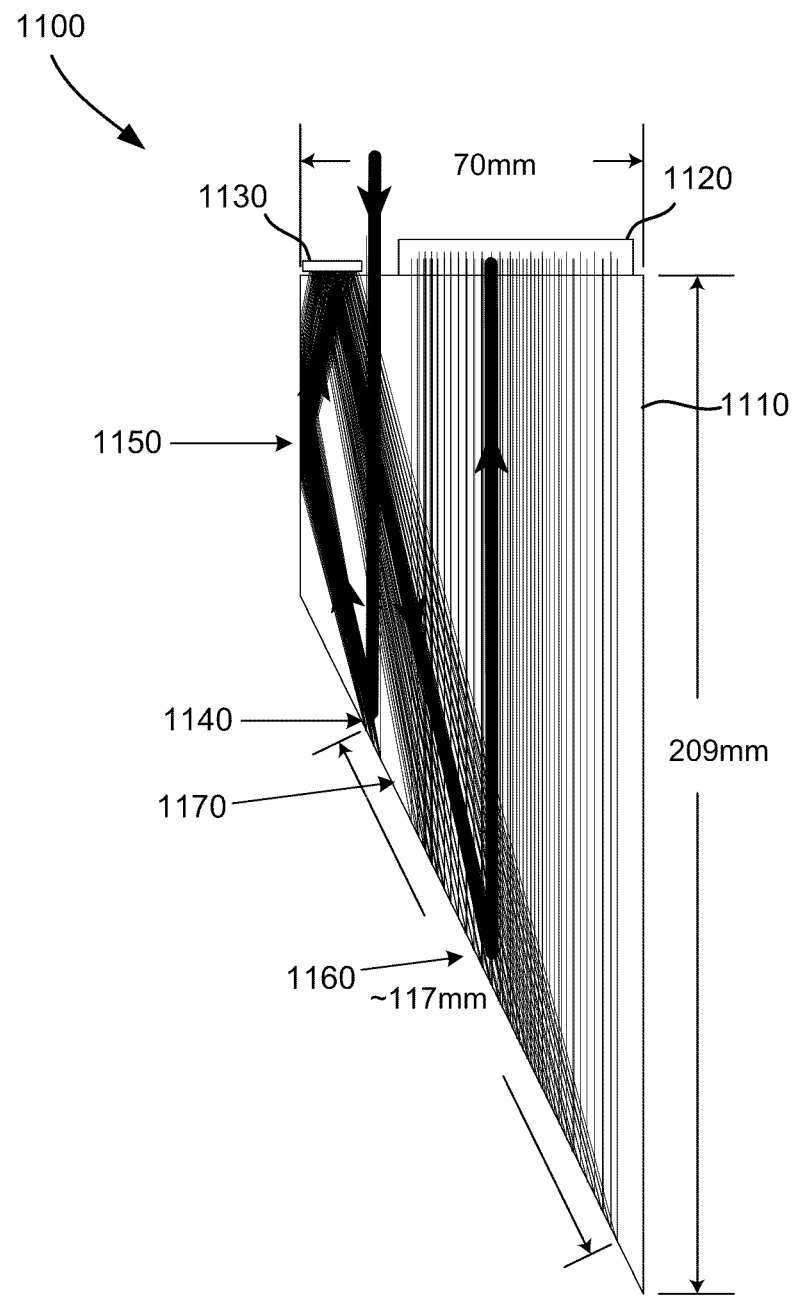
FIG. 11 is an exemplary optical signal control system with tunable dispersion and more efficient utilization of grating surface.

Diffraction gratings may be expensive with costs increasing substantially as the dimension of the grating increases. As such, it may be desirable to design a monolithic compressor (i.e., an optical signal control system) with efficient utilization of grating surfaces. FIG. 11 is an exemplary optical signal control system 1100 with tunable dispersion and more efficient utilization of grating surface. Similar to system 800 of FIG. 8A, system 1100 includes block 1110, static reflection element 1120 and adjustable reflection element 1130. The static reflection element 1120 may include a rooftop mirror and the adjustable reflection element 1130 may include an adjustable mirror. Block 1110 includes a TIR reflection surface 1150 and diffraction surfaces 1140 and 1160. The reflection element 1130 in system 1100 is positioned near the outer edge of the surface to which the prism 1120 is coupled.

The monolithic compressor of systems 800 and 1100 has nearly the same amount of dispersion, but the diffraction surface is shorter in system 1100 because the geometry of the substrate is altered slightly. The altered geometry enables the input/output optical signals to enter between the adjustable reflection element 1130 (e.g., fold mirror) and prism 1120 (e.g., rooftop assembly), instead of to the left of the adjustable fold mirror as in system 800.

The trajectory of the optical signal within the monolithic compressor block (i.e., block 1110) has been highlighted in the diagram above. The optical signal, a generally collimated beam with a typical diameter of a few millimeters and comprised of a continuum of wavelengths within a finite spectral band, enters at the top of the monolithic block and is diffracted by the grating at surface area 1140. The optical signal entry surface of the monolithic block may be AR coated. The optical signal is diffracted from surface 1140 (spectrally dispersed in angle by virtue of the wavelength-dependent diffraction) and propagates up and toward the left side of the monolithic block. The diffracted optical signal undergoes TIR at surface 1150. If the diffraction angle of the grating is such that the incidence angle to surface 1150 does not satisfy the TIR condition, a high reflection coating may be applied to the surface of the monolithic block at that location to prevent refraction.

The reflected beam propagates towards the surface at which it entered the block. In the non-adjustable system 700 of FIG. 7A, the beam either undergoes TIR at the surface or a high reflection coating is applied to the surface at that location, and the beam is reflected before exiting the monolithic block. In the adjustable system 1100 of FIG. 11, the grating pitch and incidence angle may be selected to insure that the beam does not undergo TIR at the surface but rather refracts back into air. The refracted air-borne signal is then reflected by the adjustable reflection element 1130 (e.g., adjustable mirror) positioned slightly above the surface of the monolithic block. The reflected beam reenters the monolithic block and continues toward grating surface 1160.

The spatially dispersed optical signal diffracts and reflects towards the original signal entry surface from the grating surface 1060. The various wavelengths of the continuum input signal propagate parallel to one another toward the prism 1120. At the prism 1120, the optical signal is displaced laterally (in a direction perpendicular to the plane of the paper in FIG. 11) and reflected back toward the diffraction grating 1160, whereupon the optical signal simply retraces its path in reverse between grating surface 1160, adjustable reflection element 1130, reflective surface 1150, grating surface 1140 and then out of the monolithic block at a location adjacent to where the optical signal entered.

The compact device results for configurations that allow the input beam to enter the monolithic block between the adjustable reflective element 1130 and the prism 1120. Those skilled in the art may appreciate that for certain choices of diffraction grating line pitch and incidence angle, combined with a large bandwidth input signal, it may not be possible to find a geometry for the monolithic block substrate that enables the optical signal to enter between reflective element 1130 and the prism 1120 while avoiding spatial overlap between the signal entry location and the dispersed signal footprint at locations reflective element 1130 and the prism 1120. If such spatial overlap cannot be avoided with the beam entry point, the less space-efficient design—with the beam entry location to the left of reflective element 1130—may avoid such spatial overlap. In cases where the spectral bandwidth is large and/or the diffraction angles required for a certain magnitude of dispersion create unavoidable spatial overlap regardless of the substrate geometry, it may be difficult to determine a physically realizable design of the monolithic compressor that produce the desired dispersion.

Application of the space-efficient design is not limited to the adjustable embodiment of the adjustable examples discussed, but can also be implemented in the original, non-adjustable embodiment of the invention as well.

A gap 1170 exists between diffraction surfaces 1140 and 1160. Gap 1170 is not illuminated by the input optical signal, so in practice it may not be necessary to apply a diffraction grating surface treatment to that section of the surface. Two separate, smaller diffraction grating zones may be applied to grating surfaces 1140 and 1160. Practically speaking, the processing steps required to produce a diffraction grating are time consuming and costly, and it would be far less efficient to manufacture two separate grating zones on the grating surface in separate fabrication steps rather than simply fabricating one single contiguous grating along that surface. In addition, the proper function of the present system requires that the groove orientation at grating surface 1140 is highly parallel to the groove orientation at grating surfaces 1160, otherwise the device may generate spatial chirp in the output optical signal, degrading performance. The required degree of parallelism to avoid spatial chirp is on the order of seconds of arc, further complicating any manufacturing approach that relies on applying separate diffraction gratings at diffraction surfaces 1140 and 1160.

Figure 8B:
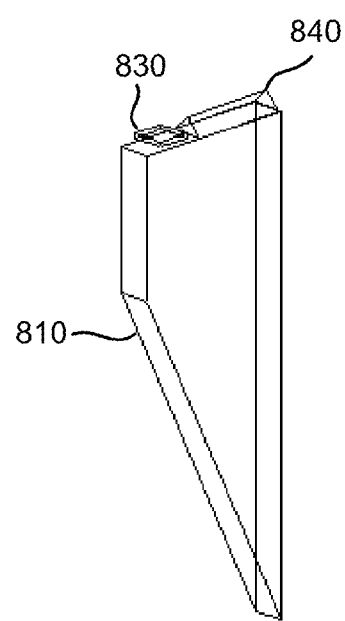
FIG. 8B is another view of the optical signal control system with tunable dispersion.

As an example of the improved compactness that is enabled by using the more space-efficient layout disclosed herein, the monolithic block compressors illustrated in FIGS. 8 and 11, one using the less space efficient layout and one using the more space efficient layout, both provide approximately 100 ps/nm of negative dispersion. Table 4 shows the exemplary overall dimensions and volume of glass required to manufacture these two designs:

TABLE 4

System dimensions

|  | Design 1 | Design 2 | Difference | % Difference |
| --- | --- | --- | --- | --- |
| Length (mm) | 227 | 209 | 18 | −7.9% |
| Width (mm) | 80 | 70 | 10 | −12.5% |
| Thickness (mm) | 16 | 16 | 0 |  |
| Angle (degrees) | 64 | 64 |  |  |
| Volume (cc) | 185.58 | 153.71 | 31.88 | −17.2% |
| Grating length (mm) | 165.00 | 117.00 | 48.00 | −29.1% |

For this example, the more space-efficient design uses 17% less glass, fits within a roughly 10% smaller footprint, and requires a grating that is nearly 30% shorter than the less space-efficient design.

Compressor with TIR Prism and Transmission Grating

Figure 12:
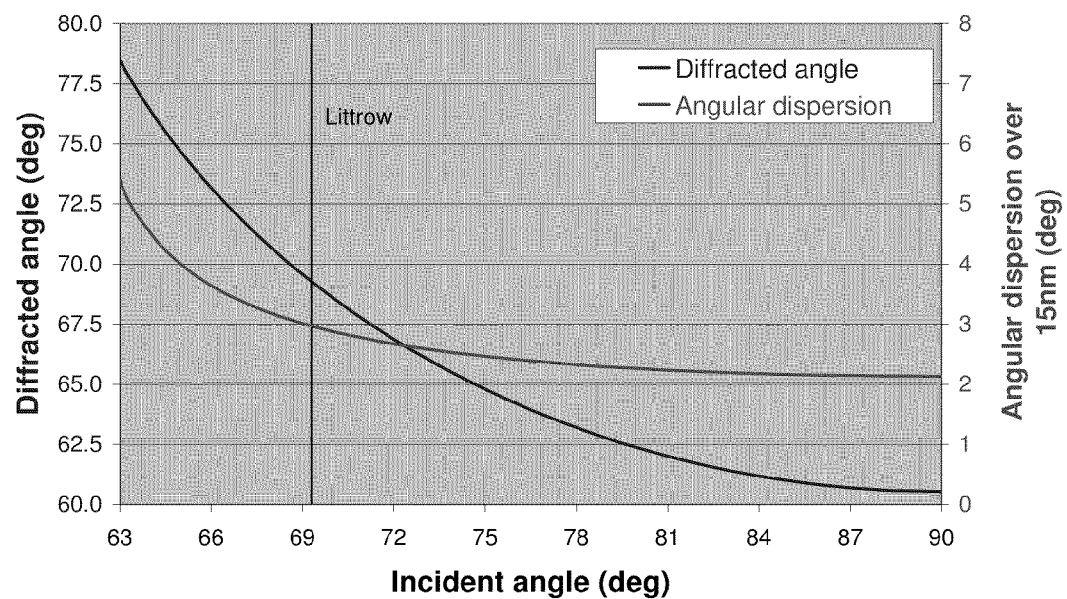
FIG. 12 is a chart of illustrating a relationship between incident angle and diffracted angle.

The level of dispersion within a block may depend on the incidence angle of the optical signal. The chart of FIG. 12 illustrates the relationship between incident angle and diffraction angle, including the Littrow angle. When operating at incidence angles below the Littrow condition, a diffraction grating produces higher angular dispersion of the incident optical spectrum. Higher angular dispersion from the grating enables the generation of a given magnitude of dispersion within a more compact physical space. In system 1100 of FIG. 11A, the input optical signal intersects the grating surface at an incidence angle that is below the Littrow angle.

Since physical compactness is a desirable feature of the monolithic compressor, it follows that designs in which the grating functions at incidence angles below Littrow may be preferable. However lower diffraction efficiency may result when operating at incidence angles below the Littrow angle. Additionally, the spectral bandwidth over which uniform, high diffraction efficiency is maintained is also reduced as the incidence angle on a grating is varied from the Littrow angle toward the grating surface normal. If high optical efficiency or wide spectral bandwidth are a higher priority than physical compactness for a given compressor design, it would be desirable to have a compressor design which offers the other functional advantages of the monolithic compressor, while enabling the optical signal to arrive at the grating at incidence angles between Littrow and grazing. Such designs of the monolithic compressor are challenging due to the progressively lower angle between the incident and diffracted beam as the incidence angle approaches the Littrow condition.

Figure 13A:
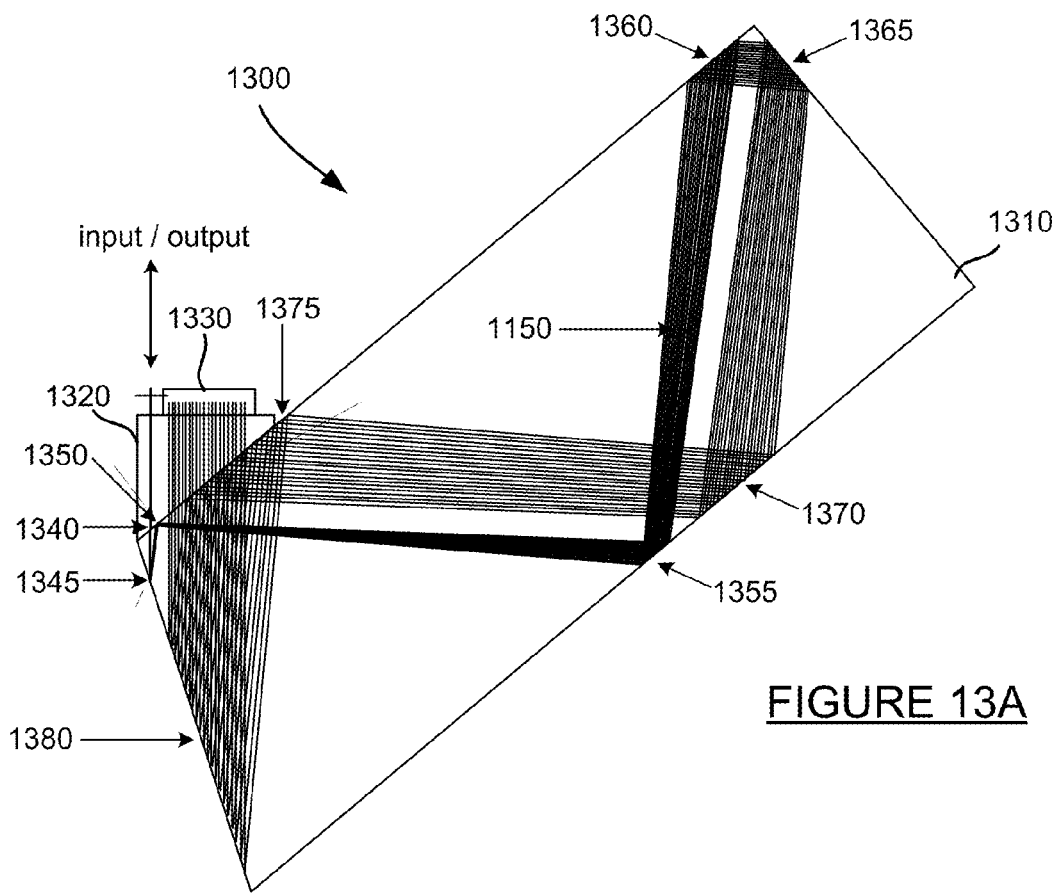
FIG. 13A is an exemplary optical signal control system with a total internal reflection prism.

FIG. 13A is an exemplary optical signal control system 1300 with a TIR prism. System 1300 includes block 1310, TIR prism 1320 and rooftop prism 1330. The input optical signal is incident on the grating surface at an angle between Littrow and grazing, at an angle close to Littrow where diffraction efficiency is highest.

For clarity, the trajectory of the optical signal has been highlighted in FIG. 13A. The optical signal, a generally collimated beam with a typical diameter of a few millimeters and comprised of a continuum of wavelengths within some finite spectral band, enters at the top of block 1310 at point 1340 and refracts across the small gap (see TIR gap 1385, FIG. 13C) between the input TIR prism 1320 and block 1310. The surface of the TIR prism 1320 is preferably AR coated at the input signal's entry location and at the TIR gap. If the angle of refraction at the TIR gap 1385 is near Brewster's angle, it may be possible to leave that surface uncoated without suffering any Fresnel reflection losses, as the input signal will be typically P-polarized relative to the plane of incidence at the TIR gap.

The optical signal propagates within the block and intersects dispersion surface 1345 at an incidence angle between Littrow and grazing. The diffracted beam, now spectrally dispersed in angle by virtue of the wavelength-dependent diffraction, propagates up and toward the right side of the block 1320, where by virtue of the change in propagation angle generated by diffraction at the grating surface, it now undergoes TIR at reflection surface 1350 at the air-glass boundary between the TIR prism and the monolithic block.

The reflected optical signal leaving reflection surface 1350 now propagates toward the right, until it reaches the opposite surface of the monolithic block at reflection surface 1355, where it either undergoes TIR reflection, or reflects at that location by virtue of a multilayer dielectric HR coating applied to the monolithic block. In the adjustable version of the device, the grating pitch and incidence angle must be selected to insure that the beam does not undergo TIR at reflection surface 1355, but instead refracts back into air, whereupon it may be reflected by an adjustable mirror positioned slightly above the surface of the monolithic block at reflection surface 1355. The reflected beam then reenters the monolithic block and continues toward reflective surface 1360.

The upper right corner of the monolithic block reflective surfaces 1360 and 1365 are polished as an accurate right angle to act as a rooftop mirror. The optical signal arrives at this location and is laterally displaced and reflected back toward reflection surface 1370 in a direction exactly anti-parallel to the incoming signal at reflective surfaces 1360 and 1365. After reflecting a second time at the monolithic block surface or adjustable mirror at reflection surface 1370, the optical signal arrives at the TIR gap a second time, where it is reflected by TIR toward the grating surface. The optical signal, now having been spatially dispersed by the first diffraction off the grating at location 1345 and subsequent propagation and various reflections, diffracts at the grating a second time at grating surface 1380. At this point, the various wavelengths of the continuum input signal now propagate parallel to one another and back toward the TIR prism gap.

Figure 13B:
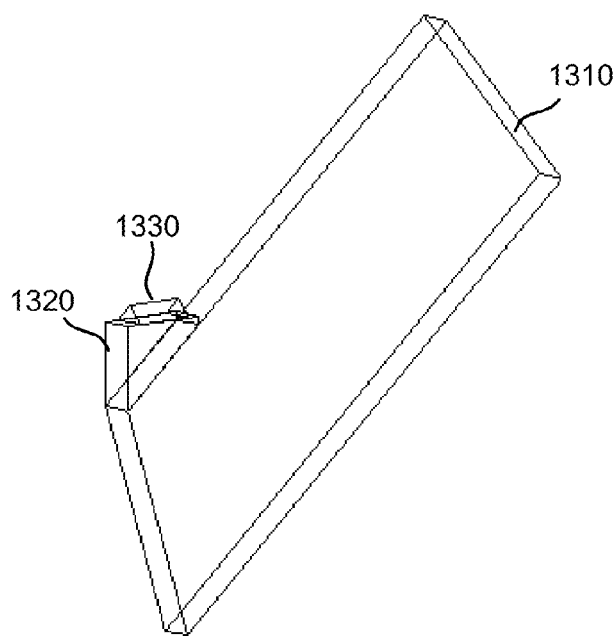
FIG. 13B is another view of an exemplary optical signal control system with a total internal reflection prism.
Figure 13C:
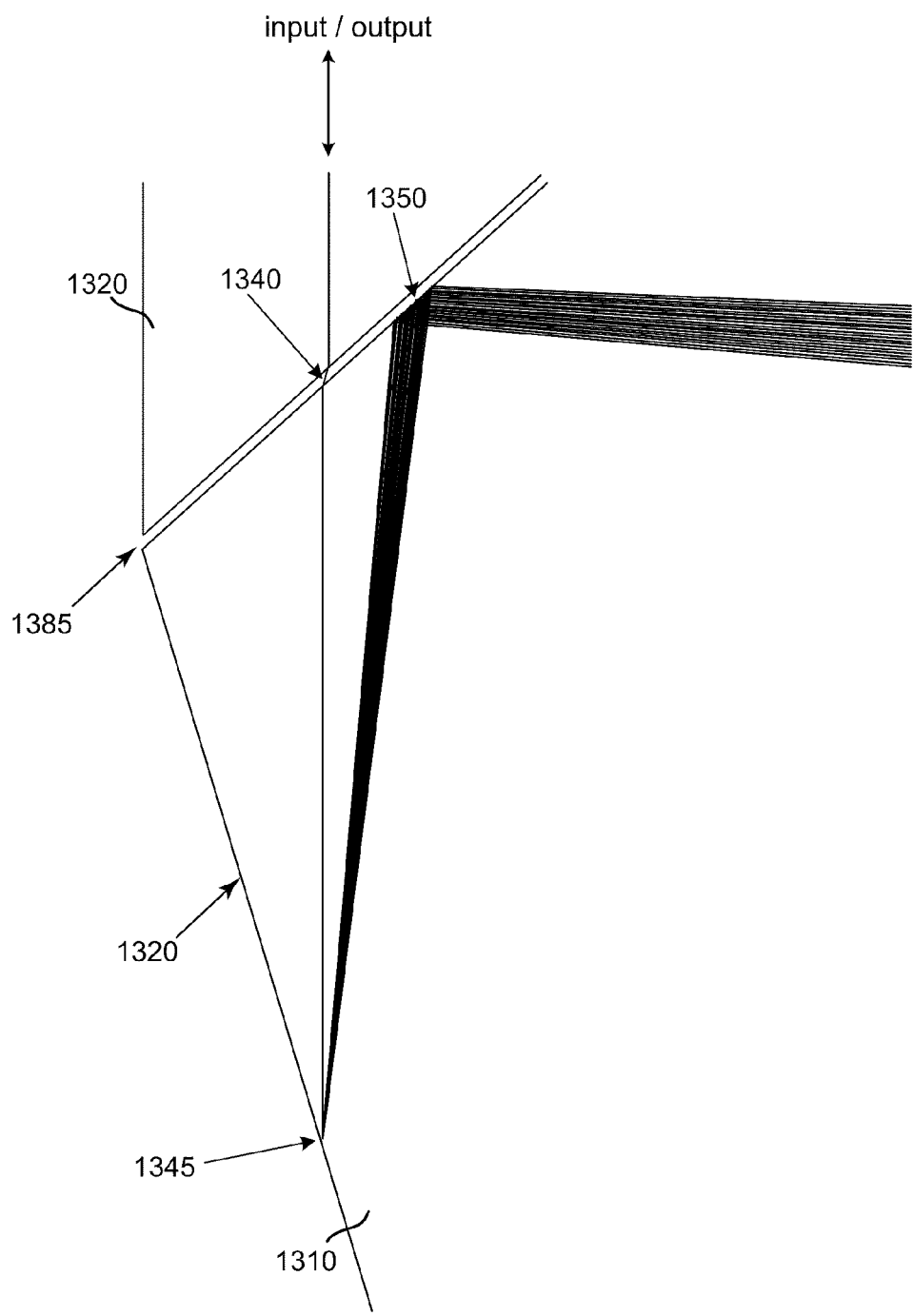
FIG. 13C illustrates a portion of an optical signal control system with a total internal reflection prism.

After refracting through the TIR gap, the optical signal arrives at the rooftop prism 1330. At the rooftop prism, by two successive TIR reflections at each of the upper prism legs, the optical signal is displaced laterally (in a direction perpendicular to the plane of the paper in FIG. 13A) and reflected back toward the diffraction grating at grating surface 1380, whereupon the optical signal simply retraces its path in reverse and back out of the block 1310 at a location adjacent to that at which it entered. FIG. 13B is another view of an exemplary optical signal control system with a total internal reflection prism. FIG. 13C illustrates a portion of the optical signal control system of FIG. 13A with a total internal reflection prism. having TIR gap 1385. Both Figures provide alternate views of the optical signal control system of FIG. 13A.

Some gratings, including transmission gratings, operate exactly at the Littrow condition while still enabling the diffracted beam to be spatially separated from the incident beam. Operation at the Littrow condition results in the highest diffraction efficiency over the widest optical signal bandwidth. Additionally, transmission gratings may offer superior overall diffraction efficiency relative to reflection diffraction gratings.

An advantage of using a transmission grating is that a corresponding block substrate may take the shape of a rectangle, so that all the angles of the substrate are 90° angles, and any irregular acute or obtuse angles are avoided altogether. This greatly simplifies the fabrication task for the monolithic block, since optical component manufacturing shops are customarily equipped and tooled for building substrates that comprise 90° angles, whereas custom tooling would typically be required to fabricate the oddly shaped substrate of the reflection grating-based monolithic compressors disclosed herein.

Furthermore, fully compressed optical pulses do not propagate through the bulk optical medium from which the monolithic block is fabricated, but rather exit into air immediately upon their fourth and final transmission through the grating surface whereupon full optical compression is obtained. Because of the all-air propagation of the fully compressed pulse, undesirable effects on the optical signal caused by non-linear changes in the refractive index of the bulk material from which the monolithic block is fabricated are minimized.

Figure 14A:
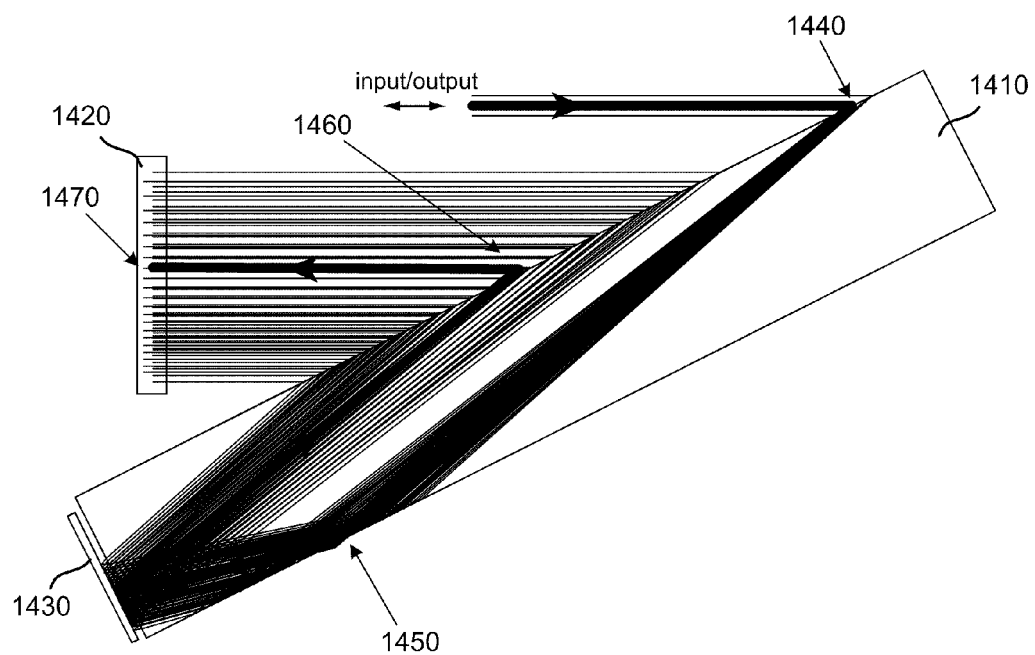
FIG. 14A illustrates an exemplary optical signal control system with a transmission grating.
Figure 14B:
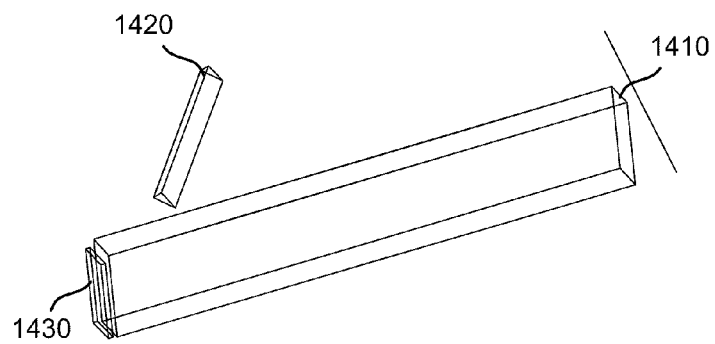
FIG. 14B illustrates another view of an optical signal control system with a transmission grating.

FIG. 14A illustrates an exemplary optical signal control system with a transmission grating. The optical signal control system includes block 1410, reflecting element 1430 and prism 1420. The optical pathway through this system is closely analogous to that of the reflection grating-based monolithic compressor. The optical signal, a generally collimated beam with a typical diameter of a few millimeters and comprised of a continuum of wavelengths within some finite spectral band, is incident on a transmission grating surface 1440. The incidence angle and overall dimensions of the grating and block must be optimized to produce the desired magnitude of overall dispersion of the optical signal as it traverses the full optical path. To provide for high diffraction efficiency and wide spectral bandwidth, it is desirable that the optical signal arrive at the diffraction grating at an incidence angle near the Littrow condition. The surface of the transmission grating is preferably AR coated to reduce Fresnel reflection losses and maximize device efficiency. FIG. 14B illustrates another view of an optical signal control system with a transmission grating.

The diffracted optical signal enters the block and propagates toward the opposing face of the block TIR surface 1450, where it preferably undergoes TIR reflection. If the diffraction angle is chosen such that the TIR condition is not achieved, a reflective coating may be applied to the surface of the block. The reflected beam propagates toward a reflection element (e.g., adjustable mirror) at a second face of the block. For fixed dispersion-versions of the device, a reflective coating may be applied to the surface of the monolithic block in place of adjustable reflection element, or the diffraction angle may be chosen such that TIR reflection occurs. In either case, for fixed dispersion versions of the design, the right angle formed by the surface 1450 and reflection element 1430 of the block should be polished to an accurate right angle with high precision to minimize spatial chirp on the dispersed optical signal after it passes through the entire optical path.

For adjustable dispersion versions of the device, the optical signal refracts out of the block towards the adjustable reflection device, where an anti-reflection coating is optionally applied to enhance efficiency. After exiting the monolithic block, the optical signal propagates a short path in air, and is then reflected by an adjustable reflection device located just above the surface of the monolithic block. The optical signal reflected at the adjustable reflection device then propagates back through the short air path and refracts back into the block. The adjustable reflection device can be tilted slightly to correct for small fabrication errors in the angles of the adjustable reflection device that would otherwise induce spatial chirp in the optical signal.

The reflected optical signal leaving the adjustable reflection device now propagates back toward the diffraction grating surface 1460 of the block where it diffracts a second time and exits the block. The optical signal, now having been spatially dispersed by the first diffraction off the grating surface and subsequent propagation and various reflections, and a secondary diffraction, is collimated so that all the various wavelengths of the continuum input signal now propagate parallel to one another and toward the prism 1470. The prism 1470 may be a right angle prism as illustrated, or may be a hollow rooftop mirror comprised of two front surface mirror oriented at right angles to one another. At the rooftop mirror, by two successive TIR reflections at each of the upper prism legs (or by front surface reflections at the two flat mirrors comprising a hollow rooftop mirror), the optical signal is displaced laterally (in a direction perpendicular to the plane of the paper in FIG. 14A) and reflected back toward the diffraction grating, whereupon the optical signal simply retraces its path in reverse and then back out of the system at a location adjacent to that at which it entered.

Note that for transmission grating-based designs, the rooftop mirror can no longer be optomechanically coupled directly to the monolithic block in a simple way, such as by bonding it to a surface of the monolithic block that is parallel to the entry face of the rooftop mirror. However such optomechanical coupling can be accomplished with auxiliary plates, optionally fabricated from the same substrate material as the monolithic block and right angle prism, in a method similar to that for attaching the adjustable mirror (as discussed above and illustrated in FIGS. 9A and 9B).

Figure 15A:
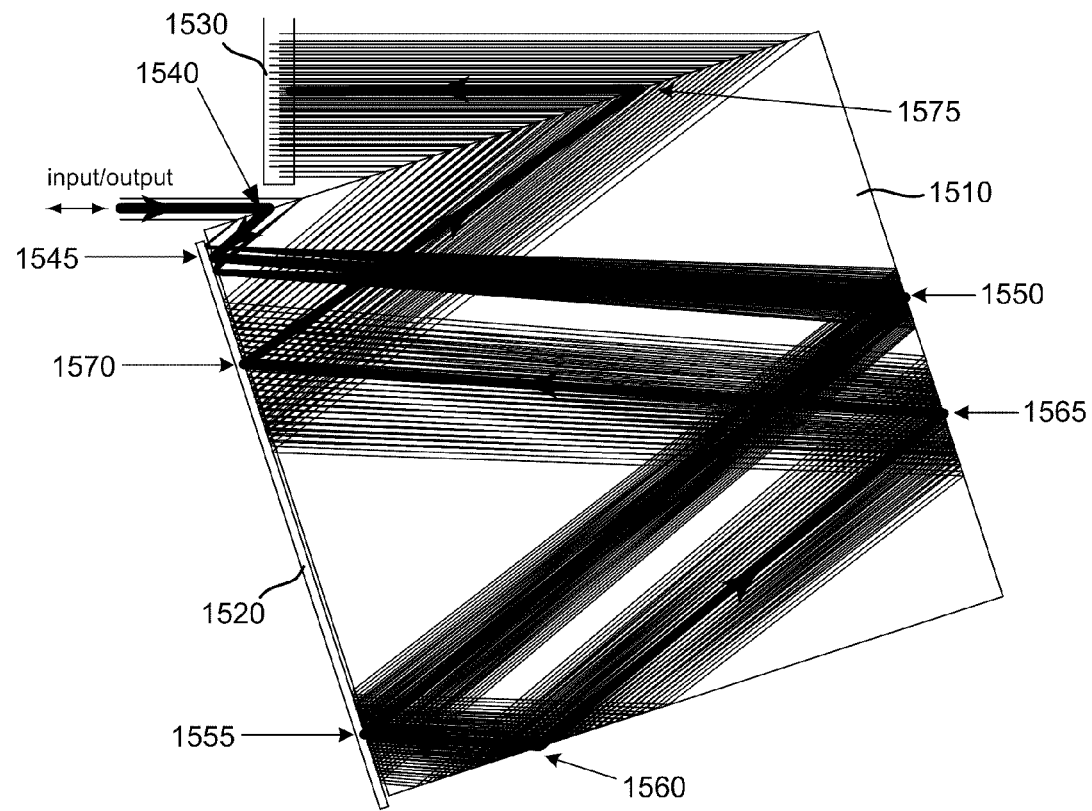
FIG. 15A illustrates another exemplary optical signal control system with a transmission grating.
Figure 15B:
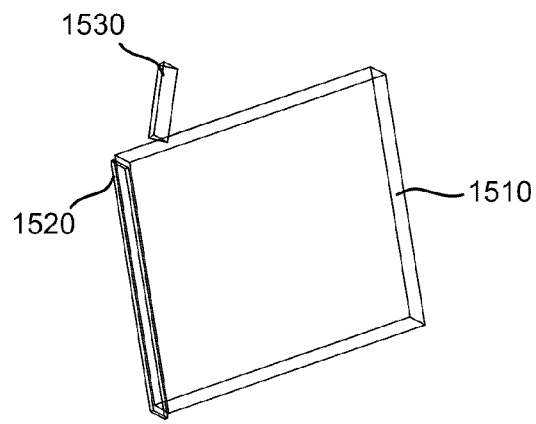
FIG. 15B illustrates another view of an optical signal control system with a transmission grating.

FIG. 15A illustrates another exemplary optical signal control system with a transmission grating and FIG. 15B illustrates another view of an optical signal control system with transmission grating. In the system of FIG. 14A, the optical path within the monolithic block has been folded with additional internal reflections by changing the aspect ratio of the rectangular block. In the optical signal control system of FIG. 15A, the adjustable mirror is located at the surface of the block containing the reflection surfaces 1545, 1555 and 1570, but it could optionally be located at the opposite face of the block containing the reflection surfaces 1550 and 1565. In some embodiments, one or more of the reflection surfaces may be TIR reflections. Both fixed dispersion and adjustable dispersion versions are possible, the former being created by eliminating the adjustable mirror and substituting a reflective coating on the monolithic block at all the reflection locations. These additional reflections may result in additional efficiency losses or more sensitive alignment, but the advantage is an overall physical dimension that may be easier to package as compared with other embodiments. Additionally, substrate cost of the block may be reduced because of better availability of optical material with suitable characteristics in the size and aspect ratio needed to fabricate the monolithic block.

Figure 16:
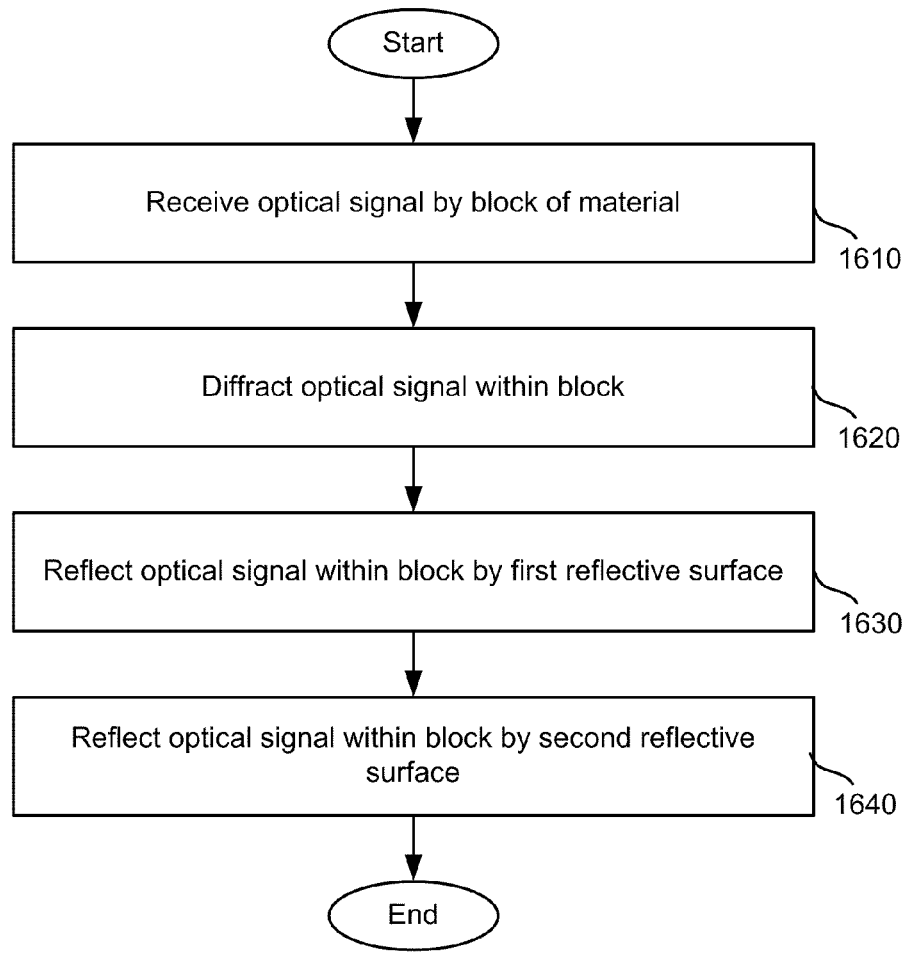
FIG. 16 is an exemplary method for controlling an optical signal.
Figures 17A, 17B:
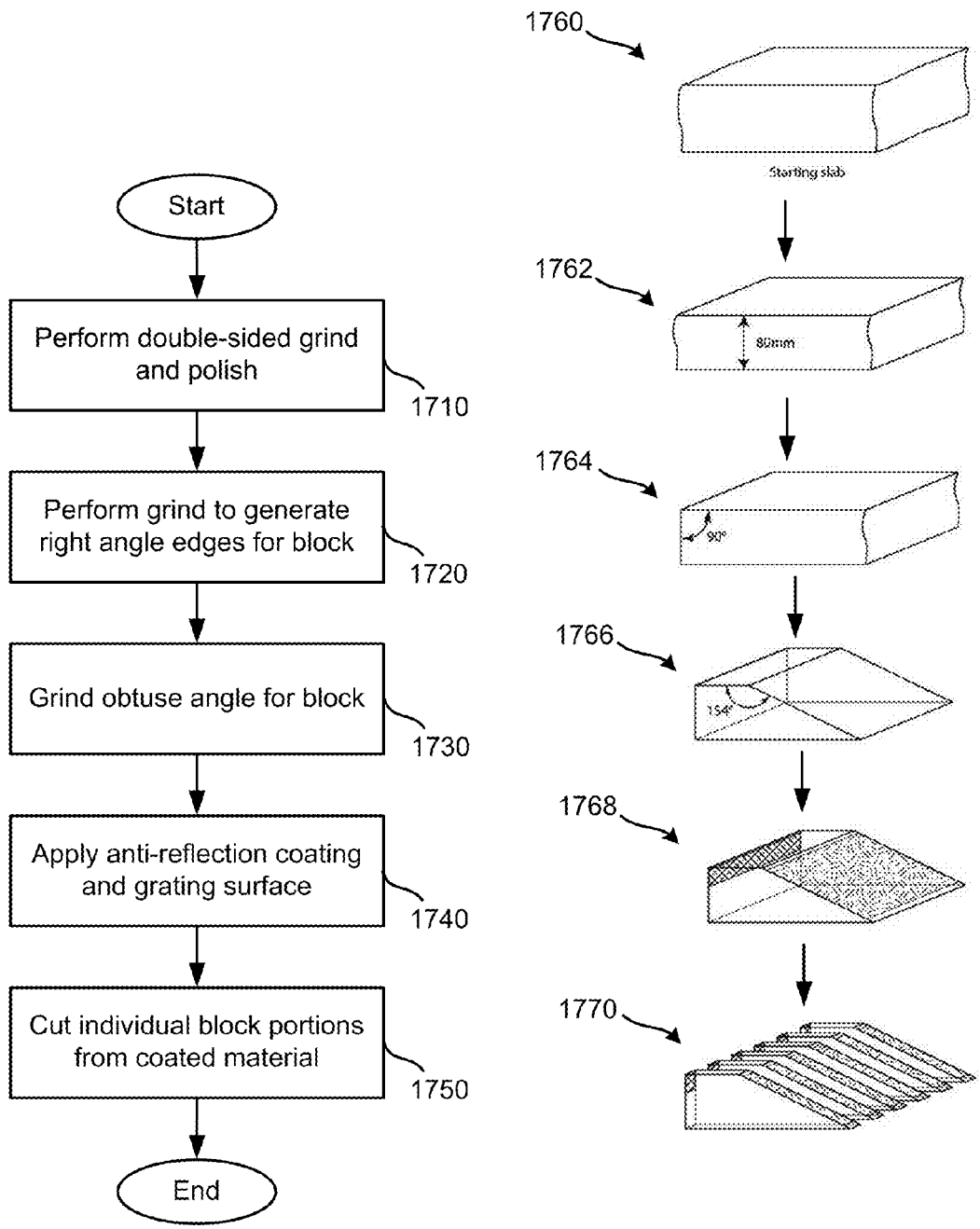
FIG. 17A is an exemplary method for fabricating an exemplary control signal system.
FIG. 17B illustrates exemplary control signal system portions during a fabrication process.

FIG. 16 is an exemplary method for controlling an optical signal. The method begins by receiving an optical signal by a block of material at step 1610. The block of material may be a single portion of material such as glass, silica, or some other material in which in an optical signal may propagate. The optical signal undergoes dispersion within the block at step 1620. Dispersion occurs when the optical signal is incident upon a grating surface, which causes the signal dispersion as well as reflection or transmission. The dispersed signal is reflected within the block by a first reflective surface at step 1630. The optical signal may then be reflected within the block by a second reflective surface at step 1640. The optical signal can then be further processed, for example to be used in a short pulse laser system FIG. 17A is an exemplary method for fabricating a block for an exemplary control signal system. FIG. 17B illustrates exemplary stages of a slab/block during a fabrication process. A double-sided grind and polish is performed at step 1710 to an initial slab 1760 to form a polished slab 1762. A grind is then performed at step 1720 to generate right angle edges for the slab 1764. The slab is further grinded to generate an obtuse angle as slab 1766 at step 1730. The slab may then be treated with surface treatments to achieve dispersion and reflection. For example, anti-reflection coating and grating surfaces may be applied to generate a slab 1768 with one or more coated surfaces at step 1740. Individual blocks 1770 may then be cut from the coated slab at step 1750.

While various embodiments have been described above, it should be understood that they have been presented by way of example only, and not limitation. The descriptions are not intended to limit the scope of the technology to the particular forms set forth herein. Thus, the breadth and scope of a preferred embodiment should not be limited by any of the above-described exemplary embodiments. It should be understood that the above description is illustrative and not restrictive. To the contrary, the present descriptions are intended to cover such alternatives, modifications, and equivalents as may be included within the spirit and scope of the technology as defined by the appended claims and otherwise appreciated by one of ordinary skill in the art. The scope of the technology should, therefore, be determined not with reference to the above description, but instead should be determined with reference to the appended claims along with their full scope of equivalents.

What is claimed is:

1. A method for controlling an optical signal, comprising:
receiving an optical signal by a block of material, the block having a plurality of sides and able to propagate an optical signal within the block;
diffracting the optical signal within the block by a diffraction surface of the block;
reflecting the diffracted optical signal within the block by a first reflective surface;
reflecting within the block the diffracted optical signal directed by the first reflective surface by a second reflective surface; and
retro-reflecting the twice reflected signal by a third reflective surface.

2. The method of claim 1, wherein at least one of the first and second reflective surfaces reflects the optical signal using total internal reflection.

3. The method of claim 1, wherein at least one of the first and second reflective surfaces reflects the optical signal using a reflective coating.

4. The method of claim 1, further comprising:
refracting the twice reflected signal by an outer surface of the block.

* * * * *